(12) United States Patent
Trapani

(10) Patent No.: US 11,017,654 B2
(45) Date of Patent: May 25, 2021

(54) METHOD AND SYSTEM FOR MOTIVATING AND MONITORING HAND WASHING IN A FOOD SERVICE OR RELATED ENVIRONMENT

(71) Applicant: FOOD SERVICE MONITORING, INC., Rochester, NY (US)

(72) Inventor: Samuel Trapani, Rochester, NY (US)

(73) Assignee: FOOD SERVICE MONITORING, INC., Rochester, NY (US)

( * ) Notice: Subject to any disclaimer, the term of this patent is extended or adjusted under 35 U.S.C. 154(b) by 0 days.

(21) Appl. No.: 16/897,211

(22) Filed: Jun. 9, 2020

(65) Prior Publication Data

US 2020/0320846 A1 Oct. 8, 2020

Related U.S. Application Data

(63) Continuation of application No. 16/539,976, filed on Aug. 13, 2019.

(Continued)

(51) Int. Cl.
| | |
|---|---|
| *G08B 21/24* | (2006.01) |
| *G06K 9/00* | (2006.01) |
| *G09B 5/02* | (2006.01) |
| *G09B 19/00* | (2006.01) |
| *A47K 10/32* | (2006.01) |
| *A47K 5/12* | (2006.01) |

(52) U.S. Cl.
CPC ....... *G08B 21/245* (2013.01); *G06K 9/00355* (2013.01); *G06K 9/00771* (2013.01); *G09B 5/02* (2013.01); *G09B 19/0076* (2013.01); *A47K 5/1202* (2013.01); *A47K 2010/3226* (2013.01); *A47K 2210/00* (2013.01)

(58) Field of Classification Search
CPC .............................. G08B 21/245; A61B 90/80
USPC ..................... 340/573.1; 4/628; 222/23, 638; 700/244
See application file for complete search history.

(56) References Cited

U.S. PATENT DOCUMENTS

| | | | | |
|---|---|---|---|---|
| 4,606,085 A | * | 8/1986 | Davies | A61B 90/80 4/619 |
| 5,199,118 A | * | 4/1993 | Cole | A47K 1/04 4/619 |

(Continued)

*Primary Examiner* — Eric Blount
(74) *Attorney, Agent, or Firm* — Hulsey P.C.

(57) ABSTRACT

Methods, hand wash monitoring system and hand wash hub system for motivating and monitoring compliance of hand washing are disclosed. Hand wash monitoring system detects presence of hands in hand washing sink. Subsequently, hand wash monitoring system initiates countdown of plurality of instructions to be displayed to user for washing hands. Plurality of instructions include wetting hands, applying soap, scrubbing hands, rinsing hands, and drying hands. Each of plurality of instructions is counted for predetermined time period. Hand wash monitoring system further monitors compliance of user following plurality of instructions for washing hands to improve compliance of hand washing with established protocol. In one embodiment, hand wash monitoring system is communicatively coupled with hand wash hub system and attendance monitoring system to display users' hand washing schedule and compliance with established protocol on external display device to get people to wash their hands more frequently and more thoroughly.

13 Claims, 13 Drawing Sheets

Related U.S. Application Data

(60) Provisional application No. 62/721,150, filed on Aug. 22, 2018, provisional application No. 62/718,441, filed on Aug. 14, 2018.

(56) References Cited

U.S. PATENT DOCUMENTS

| | | | | |
|---|---|---|---|---|
| 5,781,942 A * | 7/1998 | Allen | ................ | G08B 21/245 4/623 |
| 5,793,653 A * | 8/1998 | Segal | ................ | G07C 1/10 134/57 R |
| 5,954,069 A * | 9/1999 | Foster | ................ | G08B 21/245 134/113 |
| 5,966,753 A * | 10/1999 | Gauthier | ................ | A47K 5/12 4/623 |
| 6,195,588 B1 * | 2/2001 | Gauthier | ................ | E03C 1/05 700/11 |
| 6,236,317 B1 * | 5/2001 | Cohen | ................ | G08B 21/245 137/552.7 |
| 6,375,038 B1 * | 4/2002 | Daansen | ................ | A47K 5/1217 222/39 |
| 6,426,701 B1 * | 7/2002 | Levy | ................ | G08B 21/24 137/552.7 |
| 6,727,818 B1 * | 4/2004 | Wildman | ................ | G06F 19/3418 340/573.1 |
| 7,755,494 B2 | 7/2010 | Melker et al. | | |
| 7,774,096 B2 * | 8/2010 | Goerg | ................ | A47K 10/3662 700/236 |
| 7,871,057 B2 * | 1/2011 | Shimizu | ................ | E03C 1/0404 251/129.04 |
| 7,936,275 B2 * | 5/2011 | Bolling | ................ | G08B 23/00 340/573.1 |
| 8,090,155 B2 * | 1/2012 | Lacey | ................ | G08B 21/245 382/107 |
| 8,237,558 B2 * | 8/2012 | Seyed Momen | ..... | G01S 1/7034 340/539.11 |
| 8,648,724 B2 * | 2/2014 | Forsberg | ................ | G16H 40/20 340/573.1 |
| 9,000,926 B2 | 4/2015 | Hollock et al. | | |
| 9,030,325 B2 * | 5/2015 | Taneff | ................ | G08B 21/245 340/573.1 |
| 9,418,536 B1 * | 8/2016 | Felch | ................ | G08B 21/245 |
| 9,526,380 B2 * | 12/2016 | Hamilton | ................ | A47K 5/1217 |
| 9,613,518 B2 | 4/2017 | Dunn et al. | | |
| 9,672,726 B2 * | 6/2017 | Borke | ................ | G16H 40/20 |
| 9,715,817 B2 | 7/2017 | Wildman et al. | | |
| 10,030,371 B2 * | 7/2018 | Ciavarella | ................ | E03C 1/057 |
| 10,410,507 B2 * | 9/2019 | Pi | ................ | G08B 21/245 |
| 10,679,488 B2 * | 6/2020 | Liu | ................ | G16H 50/30 |
| 10,930,135 B2 * | 2/2021 | Shoari | ................ | G06K 19/06028 |
| 2006/0273915 A1 * | 12/2006 | Snodgrass | ................ | G08B 21/245 340/573.1 |
| 2007/0213877 A1 * | 9/2007 | Hart | ................ | G07C 9/22 700/282 |
| 2008/0303658 A1 * | 12/2008 | Melker | ................ | G08B 21/245 340/540 |
| 2009/0224907 A1 * | 9/2009 | Sinha | ................ | G08B 21/245 340/539.11 |
| 2012/0062382 A1 * | 3/2012 | Taneff | ................ | G16H 40/20 340/573.1 |
| 2014/0180713 A1 * | 6/2014 | Tenarvitz | ................ | G16H 40/20 705/2 |
| 2015/0161874 A1 * | 6/2015 | Thyroff | ................ | G08B 25/10 340/539.11 |
| 2015/0194043 A1 * | 7/2015 | Dunn | ................ | G08B 21/245 340/573.1 |
| 2016/0314683 A1 * | 10/2016 | Felch | ................ | G08B 21/245 |
| 2017/0004699 A1 * | 1/2017 | Rizvi | ................ | G08B 21/245 |
| 2018/0151054 A1 * | 5/2018 | Pi | ................ | G08B 21/245 |
| 2018/0364672 A1 * | 12/2018 | Kamatchi | ................ | G05B 19/05 |

* cited by examiner

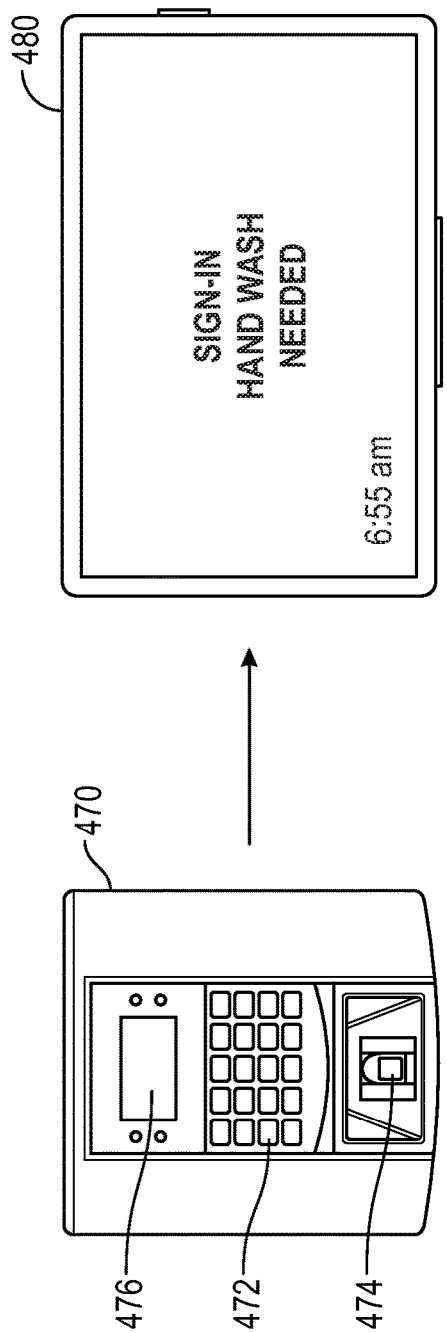
FIG. 11
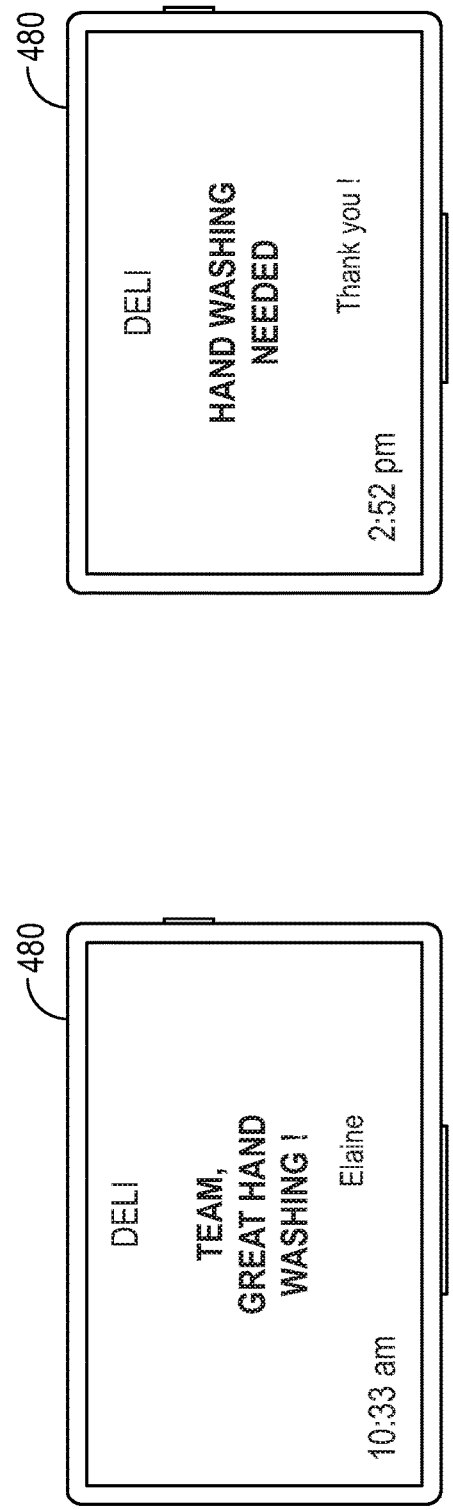
FIG. 12B
FIG. 12A

METHOD AND SYSTEM FOR MOTIVATING AND MONITORING HAND WASHING IN A FOOD SERVICE OR RELATED ENVIRONMENT

RELATED APPLICATIONS AND CLAIM FOR PRIORITY

The present application is a continuation of U.S. patent application Ser. No. 16/539,976, filed Aug. 13, 2019; which claims the benefit of U.S. Provisional Patent Application No. 62/718,441 filed Aug. 14, 2018 and U.S. Provisional Patent Application No. 62/721,150, filed Aug. 22, 2018; all of which are incorporated herein in their entirety and referenced thereto.

FIELD OF THE DISCLOSURE

The present invention generally relates to monitoring hand washing by individuals. More specifically, the present invention relates to hand wash monitoring system installed at hand washing sink or related equipment in healthcare, food processing, foodservice, and other facilities or industries, such as restaurants, hospitals, hotels, manufacturing facilities, and others. Hand wash monitoring is used for educating or coaching, monitoring and displaying compliance of hand washing by users for motivating and maintaining proper hygiene at any work environment.

BACKGROUND OF THE DISCLOSURE

United States (US) Center for Disease Control (CDC) recommends a specific procedure (protocol) for washing hands. The specific procedure includes wetting hands, applying soap, scrubbing for 20 seconds then rinsing and drying. CDC recommends the above procedure for food service industry. However, the problem of insufficient hand washing is pervasive not only in food service industry, but in medical industry as well. According to CDC, norovirus is the leading cause of disease outbreaks from contaminated food in the US. Infected food workers cause about 70% of reported norovirus outbreaks from contaminated food. The food service industry can help prevent norovirus outbreaks by making sure that food service workers practice proper hand washing and avoid touching ready-to-eat foods, such as raw fruits and vegetables, with their bare hands before serving them. There are many other food borne pathogens that are spread by lack of or improper hand washing.

The CDC also notes that, "Of outbreaks caused by infected food workers, 54% involve food workers touching ready-to-eat-foods with their bare hands." Observations of food service workers have shown that they practice proper hand washing only 1 of 4 times that they should. It is unclear as to how many food service workers do not wash hands frequently enough, however data suggests this to be a major problem.

The effect of these problems in food service is food borne illnesses that range from mild stomach distress and common cold to life threatening infection, which in some cases results in death. In the case of the medical industry, lack of hand washing compliance results in the spread of hospital acquired infections (HAI's), which affects 2 million people per year at a cost of $50 Billion.

In addition, novel Coronavirus disease (COVID-19), which is an infectious disease caused by a newly discovered coronavirus became a global pandemic. COVID-19 virus affects more people than norovirus. Most people infected with the COVID-19 virus experience mild to moderate respiratory illness and recover without requiring special treatment. Older people, and those with underlying medical problems like cardiovascular disease, diabetes, chronic respiratory disease, and cancer are more likely to develop serious illness. To protect people from getting infected with COVID-19, World Health Organization (WHO) advises people to wash hands or use an alcohol based rub frequently. WHO recommend using alcohol based rub for 20-30 seconds to protect people from getting infected with COVID-19.

Getting people to wash hands is a complex task, as it requires many components. Monitoring whether or not people wash hands is even more complex. Several attempts have been made in the past to provide hand washing compliance monitoring systems that reliably monitor and enforce whether people actually wash their hands.

An example of hand hygiene compliance system is disclosed in a U.S. Pat. No. 8,237,558, entitled "Hand hygiene compliance system" ("the '558 patent") The '558 patent discloses a system and method of encouraging compliance of hand hygiene in an environment where users move from zone to zone and are required to perform hand hygiene between the zones. Users carry a wearable zone sensor which detects zones, detects hand hygiene actions, logs time of changing zones, and hand hygiene actions. The wearable sensor can be integral with a wearable hand hygiene product dispenser and/or can operate in cooperation with a fixed dispenser configured to transmit hand hygiene actions to the wearable zone sensor. The wearable zone sensors are configured to be useable anonymously or to be associated with a user identifier, and to interface with a central computer via a docking station or communication interface to transfer data for later analysis.

Another example is disclosed in a U.S. Pat. No. 9,030,325, entitled "Hand washing enforcement system" (the "'325 patent"). The '325 patent discloses a hand cleansing monitoring system that electronically monitors and communicates hand washing frequency and procedures to management through a computer-based system.

Another example is disclosed in a U.S. Pat. No. 9,613,518, entitled "Methods and systems for monitoring hand washing" (the "'518 patent"). The '518 patent discloses using a processor to receive a signal indicative of actuation of a cleansing product dispenser at a hand cleansing station and to receive a signal indicative of the presence of an individual at said cleansing station following actuation of the cleansing product dispenser. The processor is configured to process said signals to generate hand wash event data indicative of a length of a continuous period of time spent by said individual at said hand cleansing station. Hand wash event data is collated for a plurality of hand wash events at a stand-alone hand cleansing station or a plurality of linked hand cleansing stations in order to provide an indication of hand wash quality for said plurality of hand wash events and/or an indication of a number of compliant hand wash events. A running total of compliant hand wash events may be displayed to users.

Yet another example is disclosed in a U.S. Pat. No. 8,090,155, entitled "Hand washing monitoring system" (the "'155 patent"). The '155 patent discloses a hand washing monitoring system (1) including a camera (2), a processor (4), the processor being adapted to receive from the camera images of hand washing activity. The processor analyses mutual motion of hands to determine if the hands mutually move in desired poses, and if so, the durations of the patterns; and generates a hand washing quality indication according to the analysis. The processor extracts information features from the images and generates feature vectors based on the features, including bimanual hand and arm shape vectors, and executes a classifier with the vectors to determine the poses. The processor uses edge segmentation and pixel spatio-temporal measurements to form at least some of the feature vectors.

Yet another example is disclosed in a U.S. Pat. No. 9,715,817, entitled "Hygiene monitoring system" (the "'817 patent"). The '817 patent discloses that a system and method is provided for monitoring hygiene compliance.

Yet another example is disclosed in a U.S. Pat. No. 9,000,926, entitled "Monitoring hand hygiene" (the "'926 patent"). The '926 patent discloses a method of monitoring hand washing by individuals includes monitoring the movements of individuals in an area using one or more sensors, identifying the performance of an act by an individual that requires the hands of the individual to be washed and determining whether the hands of the individual are washed after the performance of the act, wherein the determining includes tracking the motion of that individual using the one or more sensors. Sensors including arrays of thermal detectors are preferred, but other types of sensor could be included.

Yet another example is disclosed in a U.S. Pat. No. 7,755,494, entitled "Hand washing compliance detection system" (the "'494 patent"). The '494 patent discloses systems and methods are provided for monitoring use of hand washing agents to determine compliance with hand hygiene guidelines. A hand washing agent is provided with a detectable, volatile compound, such as odors, which is then rubbed onto a subject's hands using the subject's hand washing technique. After the hand washing event, the subject's hand is then exposed to a detector (such as a badge), which includes a sensor capable of detecting the volatile compound, and an indicator that communicates detection of the volatile compound, indicating use of the hand washing agent and hand hygiene compliance.

Although the above-discussed disclosures help to monitor and enforce compliance of hand hygiene in different environments, they have few problems. For example, many of the disclosures require use of sensors to detect presence of user in a given room or environment. As such, it is not feasible to provide sensors to large number of people and monitor their compliance to hand hygiene, particularly during global pandemic caused by COVID-19. Further, above-discussed disclosures do not help in validating and verifying proper and frequent hand washing.

American President Abraham Lincoln had praised the patent laws for having "secured to the inventor, for a limited time, the exclusive use of his invention; and thereby added the fuel of interest to the fire of genius, in the discovery and production of new and useful things." With an unprecedented global pandemic caused by COVID-19, education and cultural changes are needed with new and useful technology to get people to wash their hands more frequently and more thoroughly. In other words, present day methods and technology exist to monitor and enforce compliance of hand hygiene, but additional technology is needed to further improve compliance with established protocol.

Therefore, there is a need for hand wash monitoring system that determines when a person is at a hand-washing sink and whether he/she has complied with the established hand washing policy and procedure (protocol).

BRIEF SUMMARY OF THE DISCLOSURE

It is an object of the present invention to provide hand wash monitoring system that determines when a person is at a hand-washing sink and whether he or she has complied with the established hand washing policy and procedure and that avoids the drawback of known techniques.

It is another object of the present invention to provide hand wash monitoring system to provide educational or coaching and cultural change needed to get people to wash their hands more frequently and more thoroughly.

It is another object of the present invention to monitor and display names or identities and schedule of individuals or user or workers or employees in facility (food processing unit, hospital, industries and so on) to wash hands to improve compliance of hand washing with established protocol. Established protocol for washing hands includes wetting hands, applying soap, scrubbing for 20 seconds then rinsing and drying.

In order to achieve to overcome the limitations here stated, the present invention provides hand wash monitoring system that detects presence of hands in hand washing sink. After detecting, hand wash monitoring system initiates countdown of plurality of instructions to be displayed on display to user for washing hands. Plurality of instructions include wetting hands, applying soap, scrubbing hands, rinsing hands, and drying hands. Each of plurality of instructions is counted for predetermined time period, say for 5 or 15 seconds depending on the instruction or protocol. Hand wash monitoring system further monitors compliance of user following plurality of instructions for washing hands to improve compliance of hand washing with established protocol. By monitoring compliance of user following plurality of instructions for washing hands, hand wash monitoring system helps in validating and verifying proper and frequent hand washing.

Further, hand wash monitoring system is communicatively coupled to faucet generator mounted to faucet dispensing water. Faucet generator includes sensor circuit and radio transmitter. Faucet generator provides operating power to sensor circuit and radio transmitter when the water is flowing through the faucet generator. When powered, the sensor circuit provides water flow rate and temperature to the radio transmitter which then sends the information to the hand wash monitoring system to indicate that the user is at hand washing sink for washing his or her hands. Further, hand wash monitoring system is communicatively coupled to soap dispending unit and paper towel dispensing unit. Soap dispending unit stores soap used for washing hands. Paper towel dispensing unit stores paper towel used for drying hands. Each of faucet generator, soap dispending unit and paper towel dispensing unit sends amount of water supplied, soap and paper towel used, respectively for every hand wash to hand wash monitoring system. Hand wash monitoring system generates reports using data received from faucet generator, soap dispending unit and paper towel dispensing unit.

In one embodiment, each of hand wash monitoring system, faucet generator, soap dispending unit, and paper towel dispensing unit transmits data directly to server for generating reports in real-time. Authorized users may view the data and reports from server at any time on any connected device. Alerts may be generated and transmitted to interested parties when certain events occur including multiple missed hand washes, etc.

In one implementation, hand wash monitoring system includes input device configured to receive personal identification number (PIN) associated with user. Hand wash monitoring system receives PIN via input device and if PIN matches with stored PIN, then hand wash monitoring system allows user to operate hand wash monitoring system.

In another technical implementation of the present invention, hand wash monitoring system is communicatively coupled to hand wash hub system and attendance monitoring system. Further, hand wash hub system is communicatively coupled to external display device installed at a place where it is visible to all users in the facility or room or environment. In the current implementation, attendance monitoring system obtains attendance or sign-in details of users in facility and provides it to hand wash hub system. Hand wash hub system displays users' hand washing schedule and compliance with established protocol on external display device to remind and/or to get people to wash their hands more frequently and more thoroughly.

In one advantageous feature of present invention, hand wash monitoring system and hand wash hub system can be used to monitor and report use of the water supply, use of the soap dispenser, use of paper towel, presence of a specific employee and the correct sequence, timing and frequency of hand washing actions. As such, hand wash monitoring system and hand wash hub system can be installed at hand washing sink or related equipment in healthcare, food processing, foodservice, and other facilities or industries, such as restaurants, hospitals, hotels, manufacturing facilities, and others to motivate and maintain proper hygiene of users or workers or employees.

Features and advantages of the subject matter hereof will become more apparent in light of the following detailed description of selected embodiments, as illustrated in the accompanying FIGUREs. As will be realized, the subject matter disclosed is capable of modifications in various respects, all without departing from the scope of the subject matter. Accordingly, the drawings and the description are to be regarded as illustrative in nature.

BRIEF DESCRIPTION OF THE DRAWINGS

The present subject matter will now be described in detail with reference to the drawings, which are provided as illustrative examples of the subject matter so as to enable those skilled in the art to practice the subject matter. It will be noted that throughout the appended drawings, like features are identified by like reference numerals. Notably, the FIGUREs and examples are not meant to limit the scope of the present subject matter to a single embodiment, but other embodiments are possible by way of interchange of some or all of the described or illustrated elements and, further, wherein:

FIG. 11 illustrates a feature in which hand washing requirement is displayed to user upon signing-in to facility using attendance monitoring system, in accordance with one embodiment of present invention; and FIGS. 12A through 13B illustrate various features of displaying message/compliance of user's hand washing performance with attainable goals, in accordance with one exemplary embodiment of present invention.

DETAILED DESCRIPTION OF THE EMBODIMENTS

Figure 1:
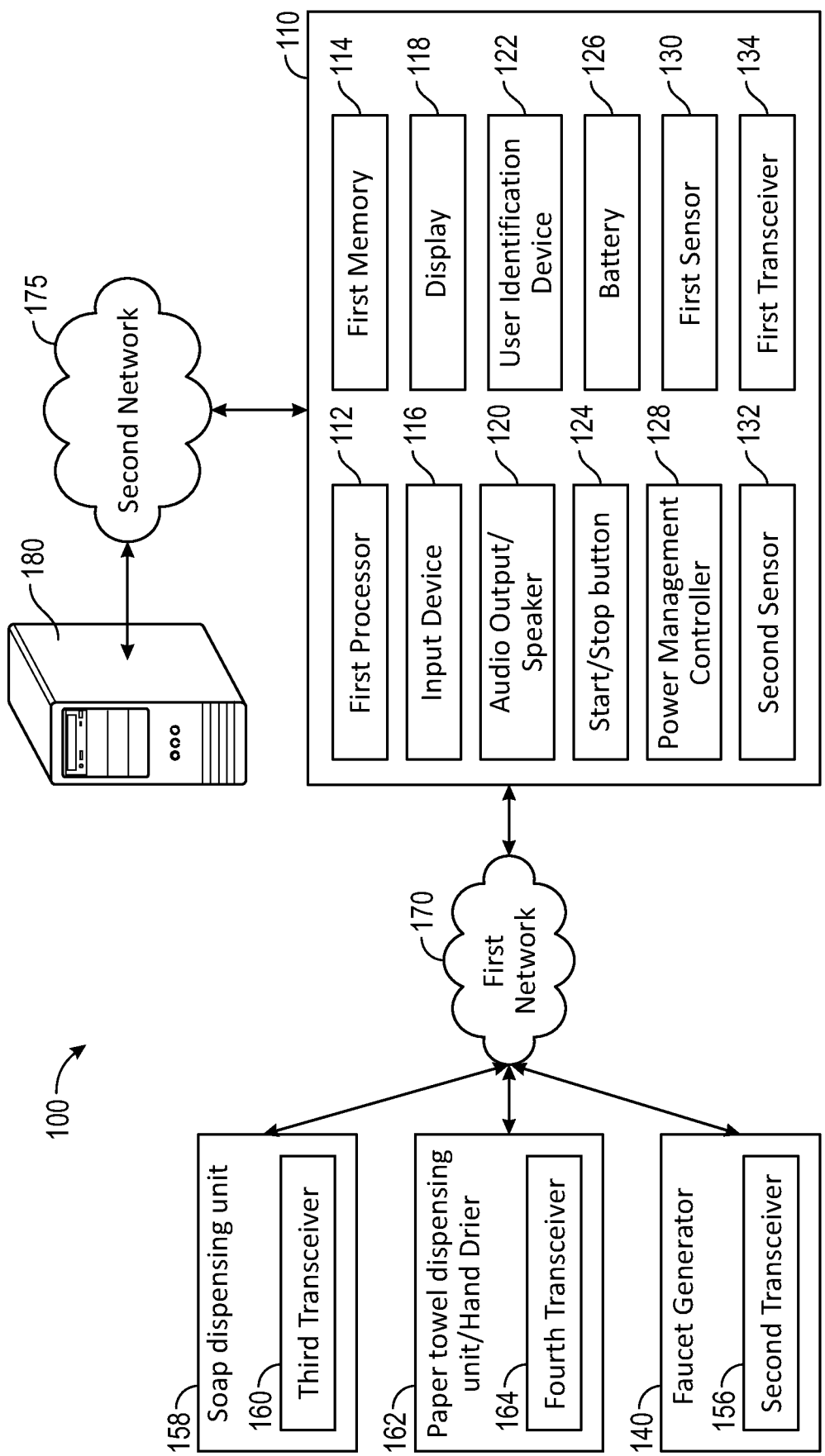
FIG. 1 illustrates an environment in which hand wash monitoring system is implemented, in accordance with one embodiment of present invention.

The detailed description set forth below in connection with the appended drawings is intended as a description of exemplary embodiments in which the presently disclosed subject matter can be practiced. The term "exemplary" used throughout this description means "serving as an example, instance, or illustration," and should not necessarily be construed as preferred or advantageous over other embodiments. The detailed description includes specific details for providing a thorough understanding of the presently disclosed method and system. However, it will be apparent to those skilled in the art that the presently disclosed subject matter may be practiced without these specific details. In some instances, well-known structures and devices are shown in functional or conceptual diagram form in order to avoid obscuring the concepts of the presently disclosed method and system.

In the present specification, an embodiment showing a singular component should not be considered limiting. Rather, the subject matter preferably encompasses other embodiments including a plurality of the same component, and vice-versa, unless explicitly stated otherwise herein. Moreover, the applicant does not intend for any term in the specification or claims to be ascribed an uncommon or special meaning unless explicitly set forth as such. Further, the present subject matter encompasses present and future known equivalents to the known components referred to herein by way of illustration.

Although the present disclosure provides a description of hand wash monitoring system, hand wash hub system and method for motivating and monitoring compliance of hand washing, it is to be further understood that numerous changes may arise in the details of the embodiments of these hand wash monitoring system, hand wash hub system and method for motivating and monitoring compliance of hand washing. It is contemplated that all such changes and additional embodiments are within the spirit and true scope of this disclosure.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure.

It should be understood that the present invention describes methods, hand wash monitoring system and hand wash hub system for motivating and monitoring compliance of hand washing with established protocols. Hand wash monitoring system detects presence of hands in hand washing sink. Subsequently, hand wash monitoring system initiates countdown of plurality of instructions (established protocols) to be displayed to user for washing hands. Plurality of instructions include wetting hands, applying soap, scrubbing hands, rinsing hands, and drying hands. Each of plurality of instructions is counted for predetermined time period. Hand wash monitoring system further monitors compliance of user following plurality of instructions for washing hands to improve compliance of hand washing with established protocol.

In one embodiment, hand wash monitoring system is communicatively coupled with hand wash hub system and attendance monitoring system to display users' hand washing schedule and compliance with established protocol on external display device to get people to wash their hands more frequently and more thoroughly.

Various features and embodiments of hand wash monitoring system, hand wash hub system and methods for motivating and monitoring compliance of hand washing are explained in conjunction with the description of FIGS. 1-13B.

In one embodiment, the present invention discloses hand wash monitoring system for monitoring and displaying compliance of hand washing by users to motivate and maintain proper hand hygiene. FIG. 1 shows environment 100 in which hand wash monitoring system 110 is implemented. Hand wash monitoring system 110 includes first processor 112, first memory 114, input device 116, display 118, audio output/speaker 120, user identification device 122, start/stop button 124, battery 126, power management controller 128, first sensor 130, second sensor 132, and first transceiver 134.

First processor 112 includes central processing unit (CPU), graphics-processing unit (GPU) or both. First processor 112 may include any suitable processing device, such as microprocessor, microcontroller, integrated circuit, logic device, or other suitable processing device.

First memory 114 communicates with first processor 112 via bus (not shown). First memory 114 may include one or more computer-readable media, including, but not limited to, non-transitory computer-readable media, RAM, ROM, hard drives, flash drives, or other memory devices. First memory 114 may store information accessible by first processor 112, including computer-readable instructions that can be executed by first processor 112. In one example, first memory 114 can be used to store data that can be retrieved, manipulated, created, or stored by first processor 112.

Instructions can be any set of instructions that when executed by first processor 112, cause first processor 112 to perform certain operations. Instructions may also reside, completely or at least partially, within first memory 114 and/or within first processor 112 during execution thereof by hand wash monitoring system 110, first memory 114 and first processor 112 also constituting machine-readable medium. Instructions may further be transmitted or received over first network 170 via first transceiver 134 utilizing any one of number of well-known transfer protocols or custom protocol.

Figure 2:
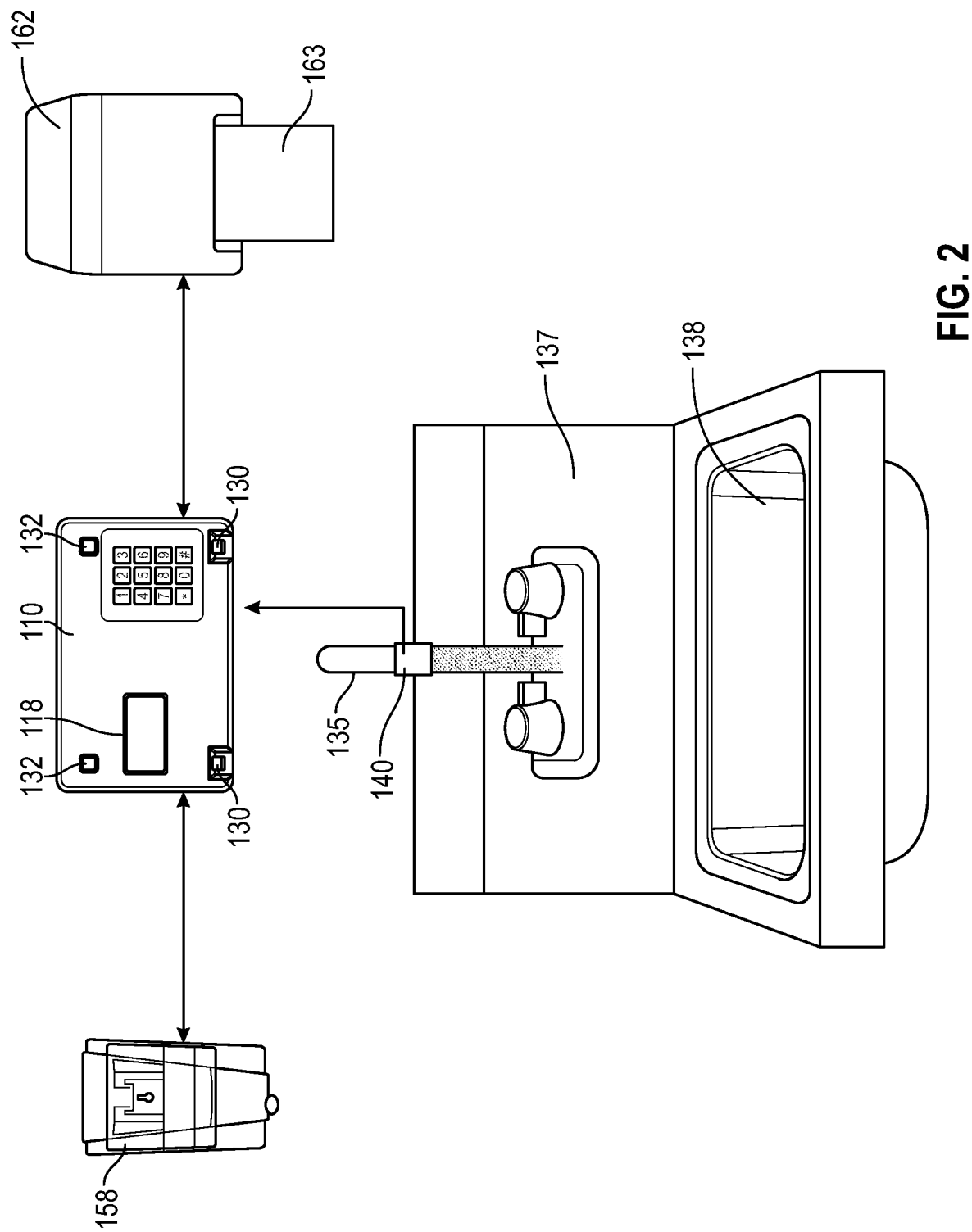
FIG. 2 illustrates a front perspective view of hand wash monitoring system communicatively coupled to faucet generator, soap dispensing unit, and paper towel dispensing unit/hand drier, in accordance with one exemplary embodiment of present invention.
Figure 3A:
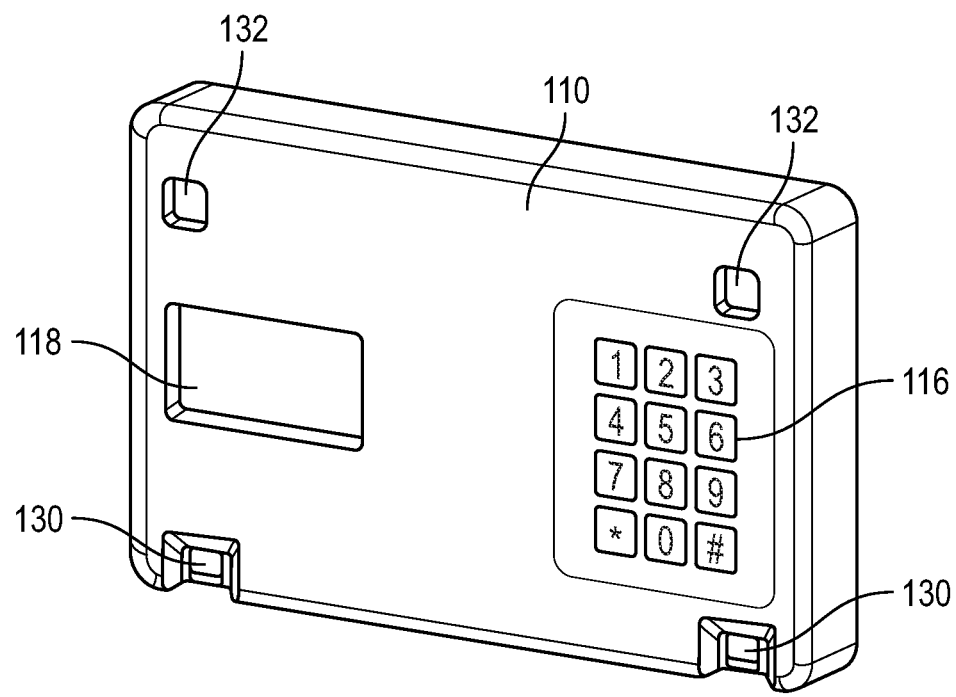
FIGS. 3A and 3B illustrates a front and side perspective view, respectively of hand wash monitoring system, in accordance with one embodiment of the invention.

Input device 116 includes mouse, keyboard/keypad, or touch screen used for providing an input to hand wash monitoring system 110. Referring to FIGS. 2 and 3A, a front view and a front perspective view, respectively of hand wash monitoring system 110 including input device 116 is shown, in accordance with one exemplary embodiment of the present invention.

Display 118 includes a device used for displaying data in the form of text/video to users.

Audio output or speaker 120 includes a device used for providing audio messages/alerts.

User identification device 122 includes a device or module used in conjunction with first memory 114 to store and match identification of the users operating hand wash monitoring system 110.

Start/stop button 124 includes a physical button provided at outer surface of hand wash monitoring system 110 or soft touch button provided on display 118. Start/stop button 124 may be configured to power ON or power OFF hand wash monitoring system 110.

Figure 3B:
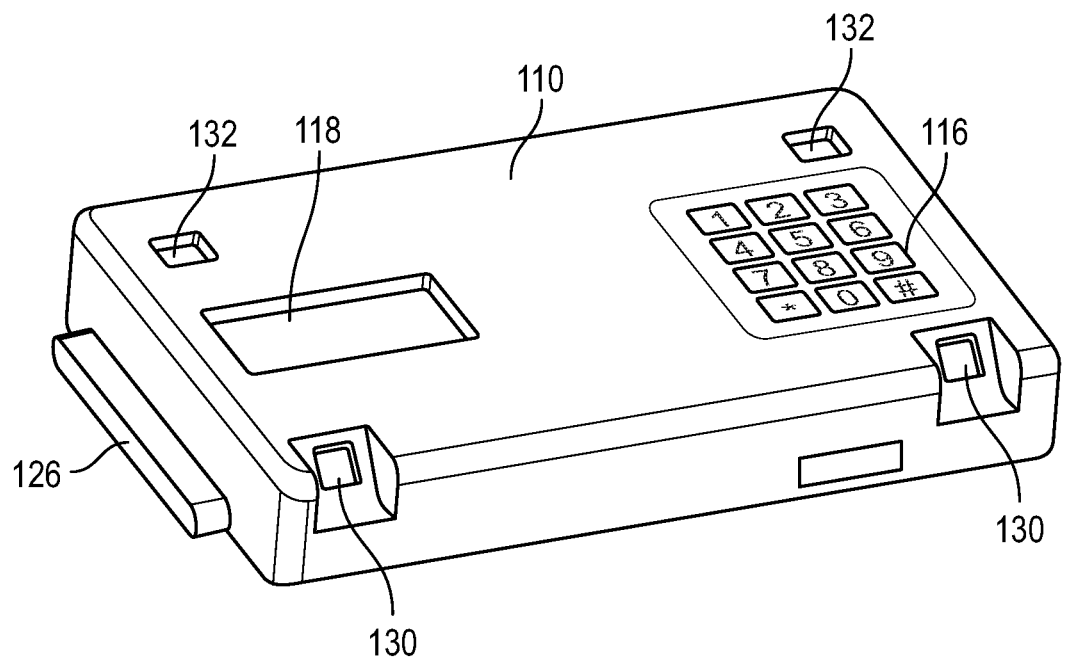

Battery 126 acts power source for operating hand wash monitoring system 110. Battery 126 may include standalone rechargeable battery or battery having an electric cord plugged to energy source (AC/DC). Referring to FIG. 3B, a side perspective view of hand wash monitoring system 110 including battery 126 is shown, in accordance with one exemplary embodiment of the present invention. In the current example, battery 126 is insertable from one side of hand wash monitoring system 110. A person skilled in the art will appreciate that battery 126 may be configured as being removable or non-removable from hand wash monitoring system 110.

Power management controller 128 includes a scheme or set of instructions configured to enable hand wash monitoring system 110 to turn OFF itself when not used for a predetermined time period for reducing dynamic power consumption of battery 126. Further, scheme is configured to re-enable hand wash monitoring system 110 with a fast wake-up time of less than e.g., 1 millisecond (ms), when user presses start/stop button 124.

First sensor 130 may include body sensor or camera or image sensor configured to detect or capture presence of user in front of hand wash monitoring system 110. In one example, first sensor 130 may include optical, infrared, or laser detection sensor configured to detect position of user in front of hand wash monitoring system 110.

Second sensor 132 may include hands sensor or camera or image sensor configured to detect or capture presence of hands of user in hand washing sink. In one example, second sensor 132 may include optical, infrared, or laser detection sensor configured to detect position of hands placed under faucet 135 or water flowing from faucet 135 into drain (not shown).

Although it is shown that first sensor 130 and second sensor 132 are provided within hand wash monitoring system 110, person skilled in the art will appreciate that they can be provided as external devices i.e., away from hand wash monitoring system 110. For example, first sensor 130 may be provided at the wall, above and adjacent to hand wash monitoring system 110 or above hand washing sink 137 such that first sensor 130 captures presence of user in its field of view. Similarly, second sensor 132 may be placed at different location to detect position of hands. When first sensor 130 and second sensor 132 are provided as external devices, they capture presence of user and hands, respectively and transmit signals to first processor 112 for processing the data sensed by them.

First transceiver 134 sends and receives data from hand wash monitoring system 110 to other devices such as faucet generator 140, soap dispensing unit 158, paper towel dispensing unit/hand drier 162 or other devices such as server 180. FIG. 2 shows an exemplary embodiment of hand wash monitoring system 110 connected to soap dispending unit 158 and paper towel dispensing unit/hand drier 162.

As specified above, hand wash monitoring system 110 is installed above hand washing sink 137. In order to use hand wash monitoring system 110 for motivating, monitoring and displaying users for washing hands, faucet generator or hydro generator 140 is provided at faucet 135 that dispenses water into hand washing sink 137.

Figure 4A:
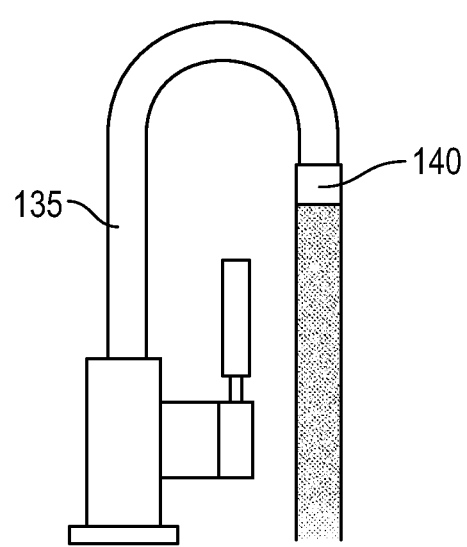
FIG. 4A illustrates a feature of faucet generator mounted at one end of faucet, in accordance with one embodiment of the invention.
Figure 4B:
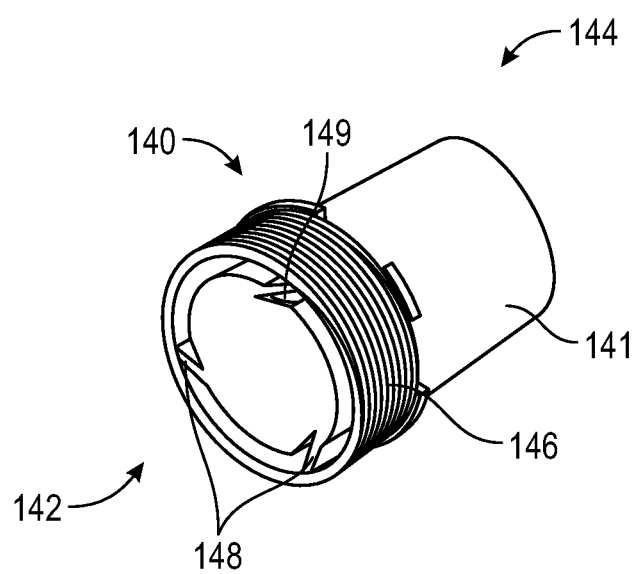
FIGS. 4B through 4D illustrate a side, top and bottom perspective view, respectively of faucet generator, in accordance with one embodiment of the invention.
Figure 4C:
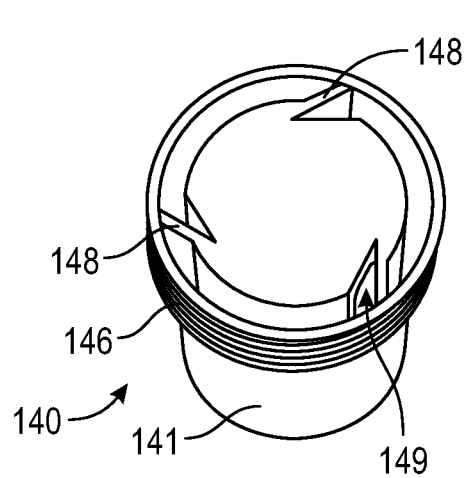
Figure 4D:
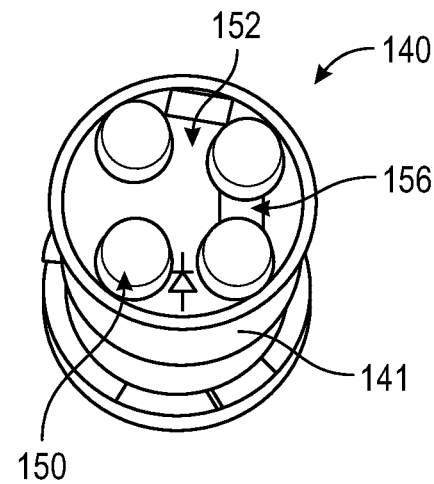
Figure 5:
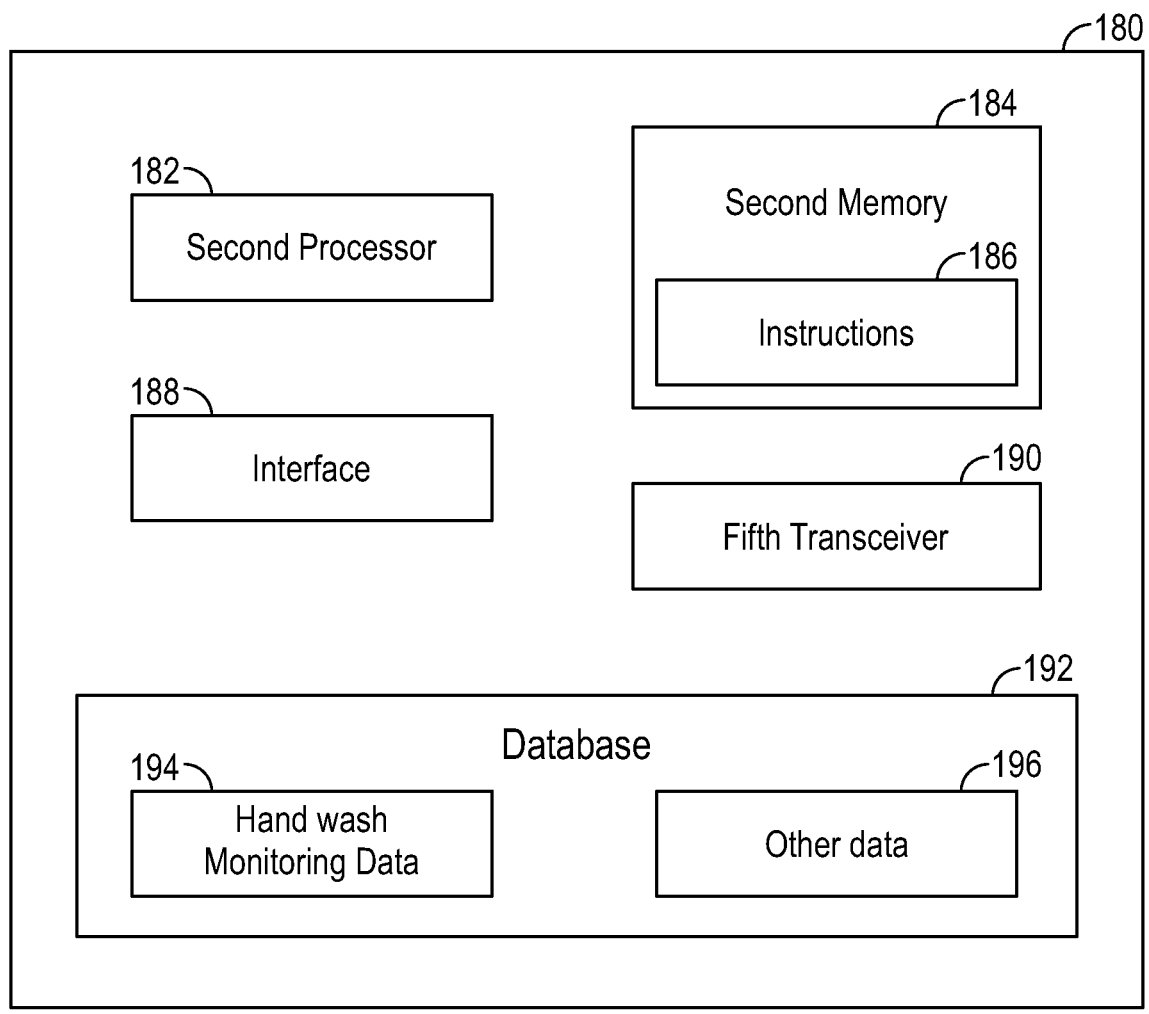
FIG. 5 illustrates a block diagram of server, in accordance with one embodiment of the invention.

Referring to FIG. 4A, faucet generator 140 mounted at an end of faucet 135 i.e., where water is dispensed through faucet 135 is shown, in accordance with one embodiment of the present invention. FIGS. 4B through 4D show side perspective view, top perspective view and bottom perspective view of faucet generator 140. Faucet generator 140 includes cylindrical housing 141 made up of plastic, metal or any other suitable material. Further, faucet generator 140 includes first end 142 and second end 144. First end 142 indicates front end where faucet generator 140 is mounted to faucet 135, and second end 144 indicates another end. At first end 142, faucet generator 140 includes threaded portion 146 for inserting and mounting faucet generator 140 into faucet 135. Further, faucet generator 140 includes three (3) water intakes 148, each having an opening 149 as shown in FIGS. 4B and 4C. At second end 144, faucet generator 140 includes four (4) light-emitting diodes (LEDs) 150 mounted with waterproof seal filing 152. Further, faucet generator 140 includes sensor circuit (not shown) and second transceiver 156. Second transceiver 156 is configured to send and receive signals from hand wash monitoring system 110.

Referring to FIGS. 1 and 2, hand wash monitoring system 110 is communicatively coupled to soap dispensing unit 158. Soap dispensing unit 158 may indicate housing placed adjacent to hand wash monitoring system 110 and diagonally to hand washing sink 137 at a height. Soap dispensing unit 158 may be used to store and dispense soap or disinfectant material (not shown) such as soap water, sanitizer including alcohol and non-alcoholic based hand sanitizers. Further, soap dispensing unit 158 includes third transceiver 160 configured to send or receive data from hand wash monitoring system 110.

Further, hand wash monitoring system 110 is communicatively coupled to paper towel dispensing unit or hand drier 162. Paper towel dispensing unit 162 may indicate housing placed adjacent to hand wash monitoring system 110 and diagonally to hand washing sink 137 at a height, for storing and dispensing paper towel 163 which the user may use after washing hands. Alternatively, user may use hand drier in place of paper towel dispensing unit. Paper towel dispensing unit 162 includes fourth transceiver 164 configured to send or receive data from hand wash monitoring system 110.

Each of faucet generator 140, soap dispensing unit 158 and paper towel dispensing unit 162 is communicatively coupled to hand wash monitoring system 110 via first network 170.

First network 170 may include a short-range wireless network such as Bluetooth, ZigBee, Radio-frequency Identification (RFID), beacons, Near Field Communication (NFC) and so on. Alternatively, first network 170 may include wireless network, wired network or combination thereof. First network 170 can be implemented as one of the different types of networks, such as intranet, local area network (LAN), wide area network (WAN), the internet, and the like. First network 170 may either be dedicated network or shared network. Shared network represents an association of the different types of networks that use variety of protocols, for example, Hypertext Transfer Protocol (HTTP), Transmission Control Protocol/Internet Protocol (TCP/IP), Wireless Application Protocol (WAP), and the like, to communicate with one another.

Further, hand wash monitoring system 110 is communicatively coupled to server 180 via second network 175. Server 180 includes second processor 182 (e.g., central processing unit (CPU), graphics processing unit (GPU) or both. Server 180 includes second memory 184 which communicate with second processor 182 via bus (not shown).

Second processor 182 may include any suitable processing device, such as a microprocessor, microcontroller, integrated circuit, logic device, or other suitable processing device.

Second memory 184 may include one or more computer-readable media, including, but not limited to, non-transitory computer-readable media, RAM, ROM, hard drives, flash drives, or other memory devices. Second memory 184 may store information accessible by second processor 182, including computer-readable instructions 186 that can be executed by second processor 182. In one example, second memory 184 can be used to store data that can be retrieved, manipulated, created, or stored by second processor 182.

Instructions 186 can be any set of instructions that when executed by second processor 182, cause second processor 182 to perform operations. Instructions 186 may also reside, completely or at least partially, within second memory 184 and/or within second processor 182 during execution thereof by server 180, second memory 184 and second processor 182 also constituting machine-readable medium. Instructions 186 may further be transmitted or received over second network 175 via fifth transceiver 190 utilizing any one of a number of well-known transfer protocols or a custom protocol.

Server 180 includes user interface (UI) 188 i.e., software or Application interface allowing user of hand wash monitoring system 110 to interact with server 180.

Server 180 further includes fifth transceiver 190 configured to send and receive data from server 180 to other devices such as hand wash monitoring system 110.

Server 180 further includes database 192. Database 192 indicates data structure configured for storing information. In the current embodiment, database 192 includes hand wash monitoring data 194, and other data 196. Hand wash monitoring data 194 includes data corresponding to hand wash monitoring system 110. For example, hand wash monitoring data 194 includes name, type, serial number, manufacturer, manufacturing date, model number, maintenance schedule, location, etc. of hand wash monitoring system 110.

Second network 175 may include wireless network, wired network or combination thereof. Second network 175 can be implemented as one of the different types of networks, such as intranet, local area network (LAN), wide area network (WAN), the internet, and the like. Second network 175 may either be dedicated network or shared network. Shared network represents an association of different types of networks that use variety of protocols, for example, Hypertext Transfer Protocol (HTTP), Transmission Control Protocol/Internet Protocol (TCP/IP), Wireless Application Protocol (WAP), and the like, to communicate with one another. Further, second network 175 may include variety of network devices, including routers, bridges, servers, computing devices, storage devices, and the like.

Referring back to FIG. 1, the constructional features and interaction of hand wash monitoring system 110, faucet generator 140, soap dispending unit 158, paper towel dispensing unit 162 and server 180 are explained. At first, hand wash monitoring system 110 is mounted above hand washing sink 137, as shown in FIG. 2. As known, hand washing sink 137 is generally mounted to a structure such as wall. As such, hand wash monitoring system 110 is mounted to wall above hand washing sink 137. As known, hand washing sink 137 includes bowl-like structure 138 used for washing hands or utensils or any other household items. Further, hand washing sink 137 includes faucet 135 directed at bowl-like structure 138 for supplying water. In accordance with one embodiment of the present invention, faucet generator 140 is mounted at the end of faucet 135, as shown in FIG. 4A. In order to mount faucet generator 140 to faucet 135, front end 142 of faucet generator 140 is made to face faucet 135. Subsequently, faucet generator 140 is inserted into faucet 135 and rotated such that faucet generator 140 is mounted to faucet 135 via threaded portion 146. After mounting faucet generator 140 to faucet 135, faucet generator 140 is communicatively connected to hand wash monitoring system 110. In operation, when user/worker/employee turns ON faucet 135, water enters faucet generator 140 through openings 149 formed at 3 water inlets 148. Subsequently, second transceiver 156 transmits radio signal to hand wash monitoring system 110 indicating that user has turned ON faucet 135 for washing hands. After receiving radio signal from faucet generator 140, hand wash monitoring system 110 is configured to turn ON and display plurality of instructions to user for motivating him to properly wash hands as per established hand washing policy and procedure. Once turned ON, hand wash monitoring system 110 initiates series/sequence of instructions to be displayed on display 118 that the user can use for properly washing his/her hands. Each of plurality of instructions is displayed along with countdown (for predetermined time period in descending or ascending order) to ensure user washes his/her hands as per established hand washing policy and procedure.

Further, soap dispending unit 158 is communicatively coupled to hand wash monitoring system 110. As specified above, soap dispending unit 158 is used for storing disinfectant which user may use for cleaning/disinfecting his hands. As such, when user uses disinfectant from soap dispending unit 158 for washing hands, then soap dispending unit 158 communicates amount of soap/disinfectant dispensed or remaining in it to hand wash monitoring system 110 or server 180. In one example, hand wash monitoring system 110 may employ first sensor 130 or second sensor 132 to capture amount of soap dispensed from soap dispending unit 158 for each hand wash. In another example, hand wash monitoring system 110 may employ other sensors (not shown) to capture amount of soap dispensed from soap dispending unit 158 for each hand wash.

Similarly, paper towel dispensing unit 162 is communicatively coupled to hand wash monitoring system 110. As specified above, paper towel dispensing unit 162 is used for storing paper towel 163, which user may use for drying after washing his hands (rinsing his hands). As such, when user uses paper towel 163 from paper towel dispensing unit 162, then paper towel dispensing unit 162 communicates amount of paper towel 163 dispensed or remaining in it to hand wash monitoring system 110 or server 180. In one example, hand wash monitoring system 110 may employ first sensor 130 or second sensor 132 to capture amount of paper towel 163 dispensed from soap paper towel dispensing unit 162 for each hand wash. In another example, hand wash monitoring system 110 may employ other sensors (not shown) to capture amount of paper towel 163 dispensed from paper towel dispensing unit 162 for drying hands after each hand wash.

Here, hand wash monitoring system 110 displays countdown of plurality of instructions (established protocols such as wetting hands, applying soap, scrubbing hands, rinsing hands, and drying hands) corresponding to use of water from faucet generator 140, use of disinfectant from soap dispending unit 158, and paper towel 163 from paper towel dispensing unit 162.

At the time of user washing his hands, hand wash monitoring system 110 monitors his compliance in following plurality of instructions displayed to him on display 118. After user completes hand washing, hand wash monitoring system 110 obtains data from faucet generator 140, soap dispending unit 158, and paper towel dispensing unit 162 corresponding to consumption of water, soap/disinfectant and paper towel 163, respectively. Hand wash monitoring system 110 repeats the above process to monitor compliance of users washing their hands. Further, hand wash monitoring system 110 transmits data in real-time or periodically to server 180 for generating reports. For example, server 180 may generate report to obtain pattern corresponding to consumption of water, soap/disinfectant, and paper towel 163 per hand wash. In another example, server 180 may generate report to obtain pattern corresponding to consumption of water, soap/disinfectant, and paper towel 163 on any given day in a week or month.

Figure 6:
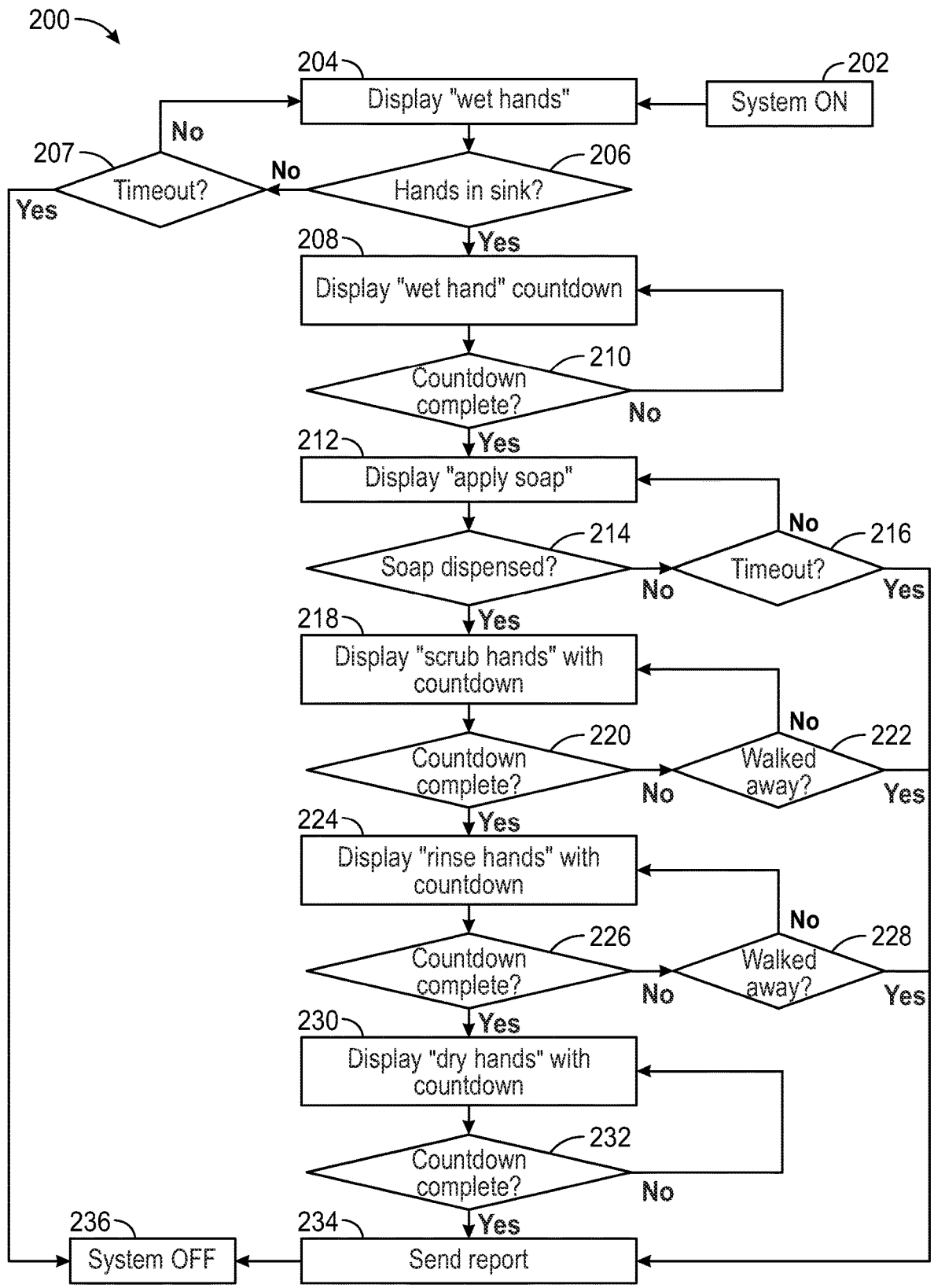
FIG. 6 illustrates a method implemented by hand wash monitoring system for motivating and monitoring hand washing, in accordance with one embodiment of present invention.
Figure 7A:
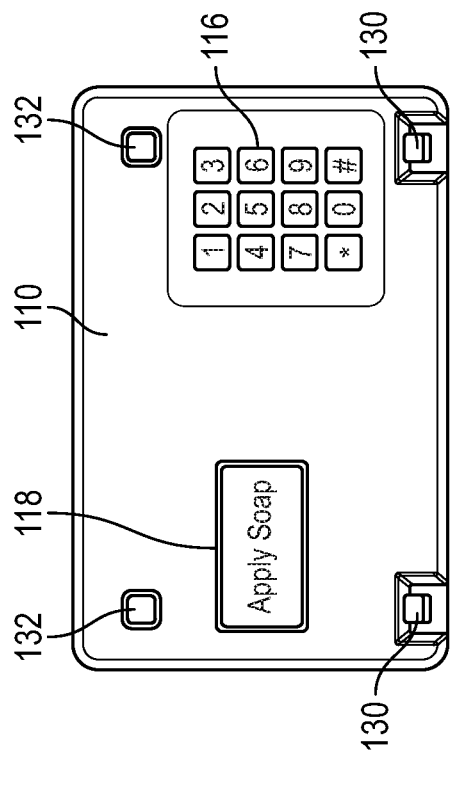
FIGS. 7A through 7G illustrate various instructions/protocols displayed at display of hand wash monitoring system, in accordance with one embodiment of the invention.
Figure 7B:
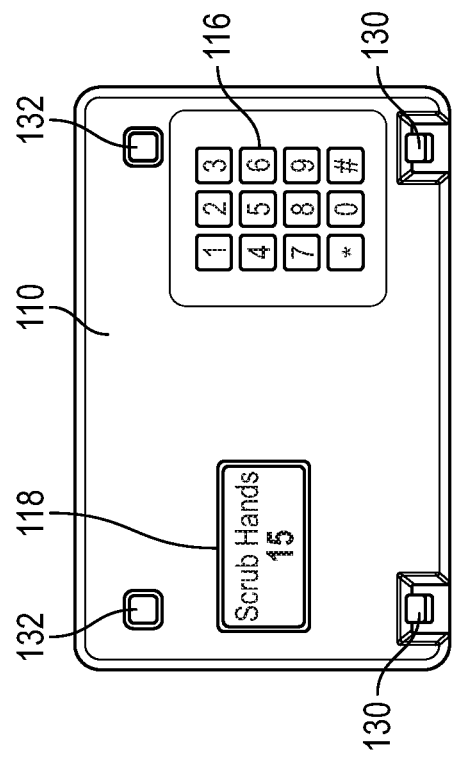
Figure 7C:
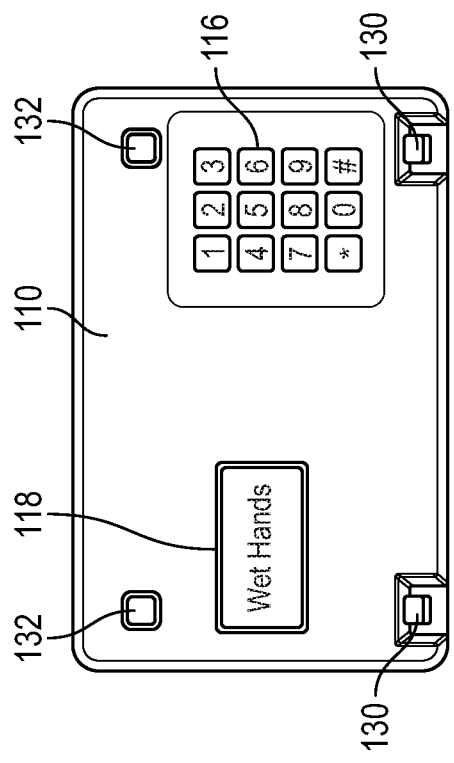
Figure 7D:
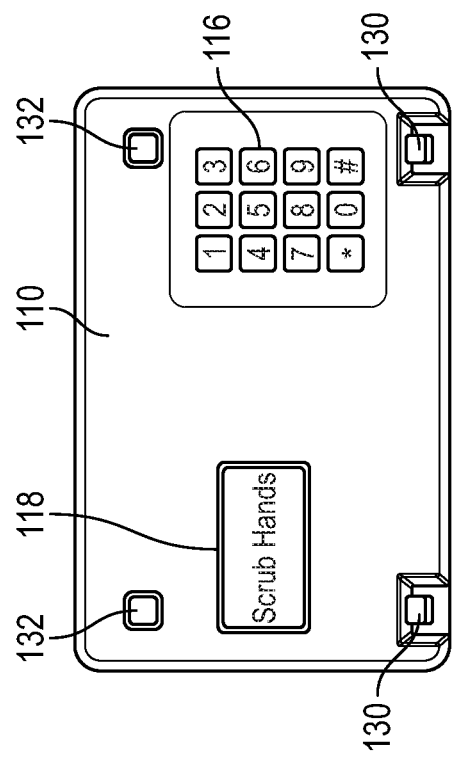
Figure 7E:
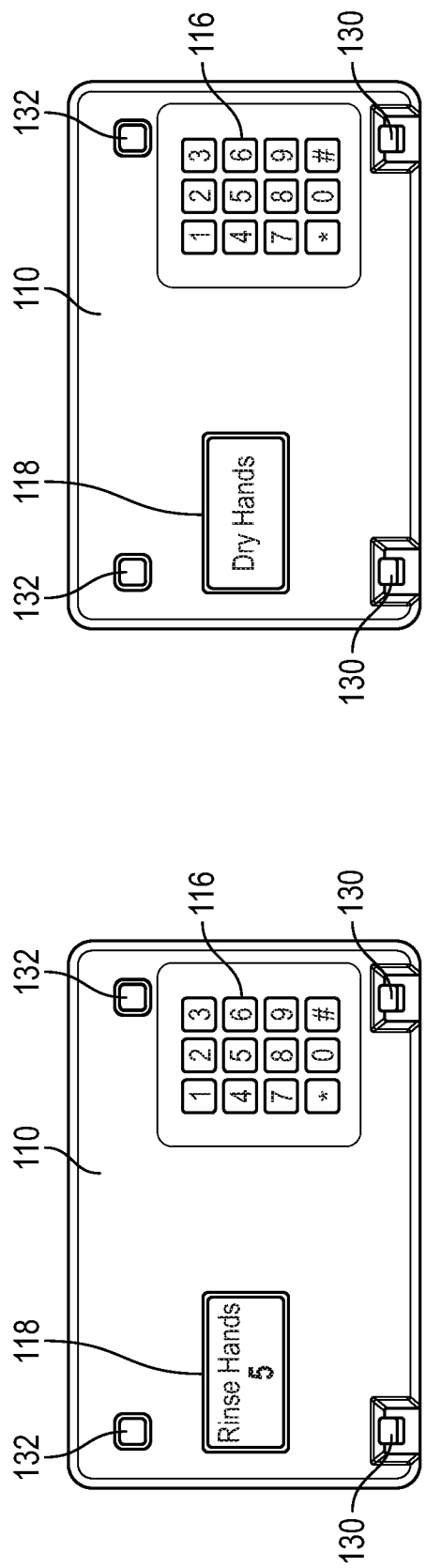
Figure 7F:
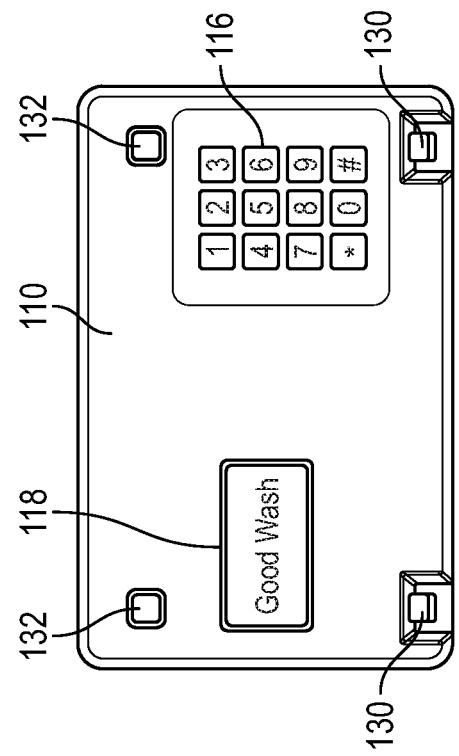
Figure 7G:
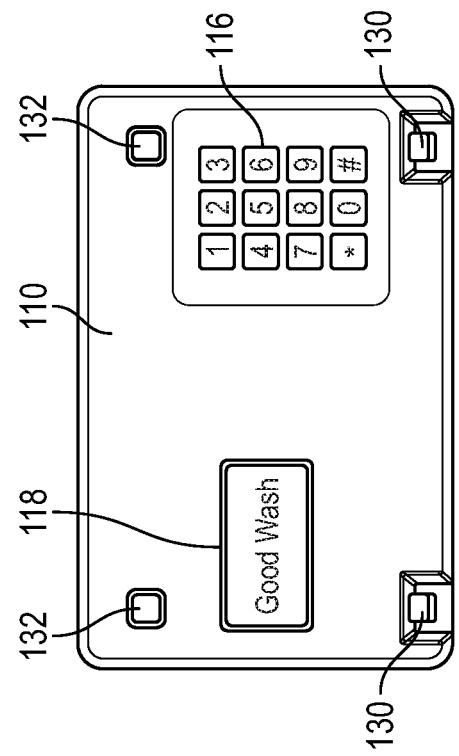
Figure 8:
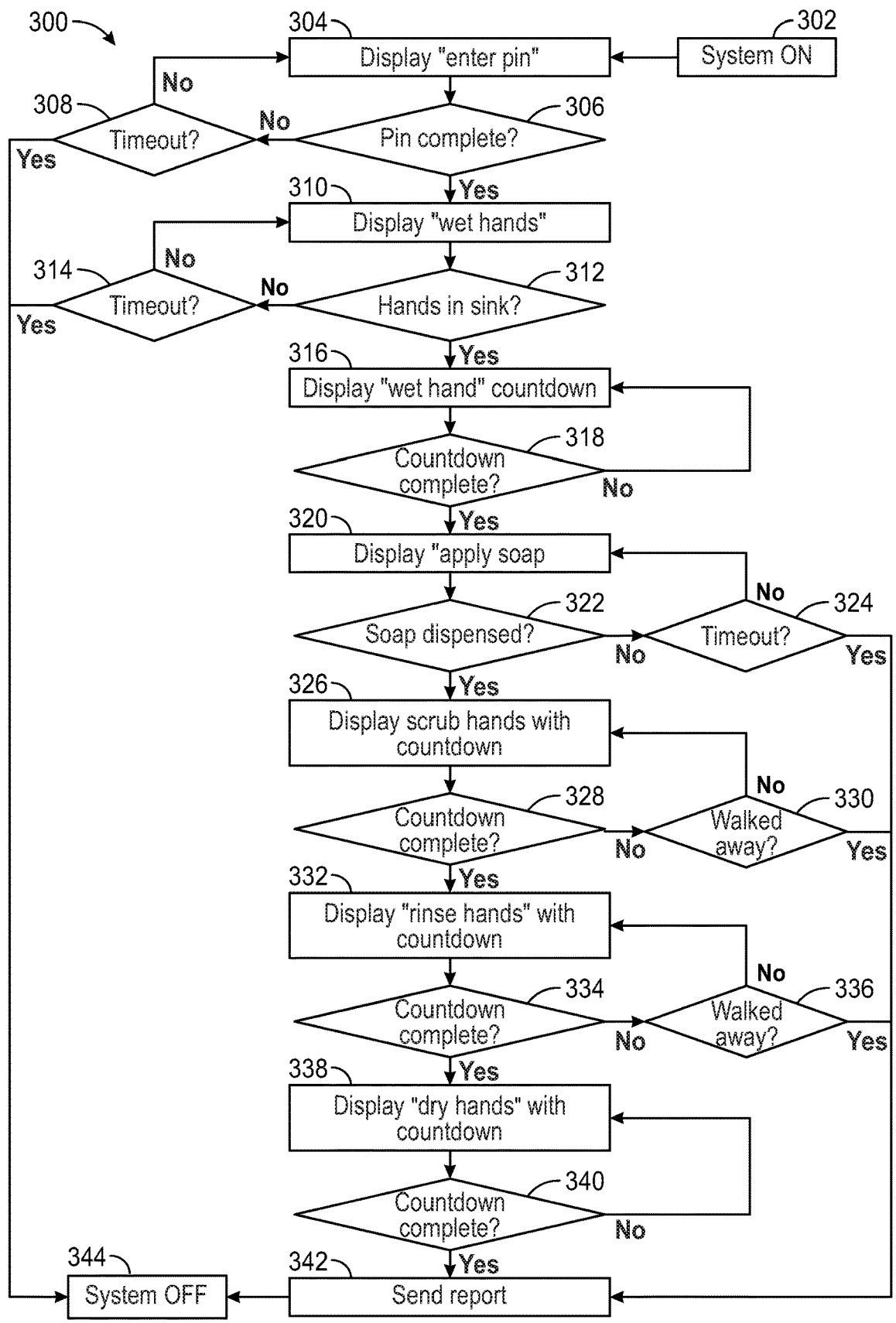
FIG. 8 illustrates a method implemented by hand wash monitoring system for motivating and monitoring hand washing, in accordance with another embodiment of present invention.

Now referring to FIGS. 6 through 7G, a method 200 (FIG. 6) of motivating and monitoring hand washing is explained with illustrations (FIGS. 7A to 7G), in accordance with one exemplary embodiment of the present invention. The order in which method 200 is described should not be construed as a limitation, and any number of the described method blocks can be combined in any order to implement method 200 or alternate methods. Additionally, individual blocks may be deleted from method 200 without departing from the spirit and scope of the subject matter described herein. Furthermore, method 200 can be implemented in any suitable hardware, software, firmware, or combination thereof. However, for ease of explanation, in the embodiments described below, method 200 may be implemented using the above-described hand wash monitoring system 110.

In order to use hand wash monitoring system 110 for motivating and monitoring hand washing, hand wash monitoring system 110 is placed above hand washing sink 137 as shown in FIG. 2. Further, faucet generator 140 is mounted to faucet 135. Further, soap dispending unit 158, and paper towel dispensing unit 162 are mounted diagonally and above hand washing sink 137, as shown in FIG. 2.

Faucet generator 140 provides operating power to the sensor circuit and second transceiver 156 when the water is flowing through faucet generator 140. When user turns ON faucet 135, water enters faucet generator 140 mounted at the end of faucet 135. Subsequently, the sensor circuit provides water flow rate and temperature to second transceiver 156 which then sends the information to the hand wash monitoring system 110 to indicate that the user is at hand washing sink 137 for washing his hands. Specifically, faucet generator 140 transmits radio signal to hand wash monitoring system 110 through second transceiver 156. In one example, faucet generator 140 may detect temperature of water and transmit signal to hand wash monitoring system 110. In another example, faucet generator 140 may include water flow and water temperature monitor and to further indicate whether water actually went down the drain, in what amount, and at what water temperature. After receiving the radio signal, hand wash monitoring system 110 turns ON, as shown at step 202.

Alternatively, if faucet generator 140 is not present, then the user may use start/stop button 124 to turn ON hand wash monitoring system 110. Alternatively, hand wash monitoring system 110 may be configured to turn ON first sensor 130, or second sensor 132, or both to confirm presence of user at hand washing sink 137. For instance, first sensor 130 may be employed to check presence of user at hand washing sink 137. Further, second sensor 132 may be employed to check presence of hands in bowl-like structure 138 of hand washing sink 137. After receiving signals that indicates or confirms presence of user or his hands from first sensor 130, or second sensor 132, or both, hand wash monitoring system 110 may turn ON.

Once turned ON, hand wash monitoring system 110 displays an instruction "wet hands" at display 118, as shown at step 204. An example of hand wash monitoring system 110 displaying instruction "wet hands" is shown in FIG. 7A.

At step 206, hand wash monitoring system 110 checks if user's hands are in hand washing sink 137. In order to check presence of user's hands in hand washing sink 137, hand wash monitoring system 110 may employ second sensor 132. If it is determined that user's hands are present in hand washing sink 137, then method 200 moves to step 208. Else, method 200 moves to step 207. At step 207, hand wash monitoring system 110 waits for predetermined time period, say 5 seconds, to check for presence of hands in hand washing sink 137. If second sensor 132 determines that there are no hands in hand washing sink 137 at the end of predetermined time period, then method 200 moves to step 236. If second sensor 132 determines presence of hands in hand washing sink 137 before the end of countdown of predetermined time period, then method 200 moves to step 204.

At step 208, hand wash monitoring system 110 displays instruction "wet hands" countdown at display 118, as shown in FIG. 7A. For example, hand wash monitoring system 110 may display countdown for predetermined time period, say 5 seconds. The countdown may be displayed in descending order such as 5, 4, 3, 2 and 1. Alternatively, countdown may be displayed in ascending order such as 1, 2, 3, 4 and 5.

At step 210, hand wash monitoring system 110 checks if the countdown has been completed. If the countdown is complete, then method 200 moves to step 212. Else, step 210 is repeated. At step 212, hand wash monitoring system 110 displays instruction "apply soap" on display 118 indicating to user to use soap/disinfectant from soap dispending unit 158, as shown in FIG. 7B. In accordance with current embodiment, hand wash monitoring system 110 initiates countdown and displays instruction "apply soap" on display 118, say for 5 seconds. Simultaneously, hand wash monitoring system 110 checks with soap dispending unit 158 if soap/disinfectant stored in it has been dispensed within the predetermined period, as shown at step 214. If soap dispending unit 158 sends instruction that soap has been dispensed within 5 seconds, then method 200 moves to step 218. If hand wash monitoring system 110 does not receive confirmation regarding soap dispensation from soap dispending unit 158 after 5 seconds countdown (step 216), then method 200 moves to step 234.

At step 218, hand wash monitoring system 110 displays instruction "scrub hands" on display 118 indicating to user to use soap/disinfectant from soap dispending unit 158, as shown in FIG. 7C. In one example, hand wash monitoring system 110 may display instruction "scrub hands" countdown for predetermined time period, say 15 seconds at display 118, as shown in FIG. 7D. Hand wash monitoring system 110 may display (step 220) countdown in descending order such as 15, 14, 13, and so on and waits until the end of countdown. Simultaneously, hand wash monitoring system 110 employs first sensor 130 to check presence of user near hand washing sink 137. If the user is still present and follows the instruction displayed till the end of countdown (step 220), then method 200 moves to step 224. If first sensor 130 determines that user is not present near hand washing sink 137 indicating he has walked away (step 222), then method 200 moves to step 234.

At step 224, hand wash monitoring system 110 displays instruction "rinse hands" on display 118 indicating to user to use soap/disinfectant from soap dispending unit 158, as shown in FIG. 7E. In one example, hand wash monitoring system 110 may display instruction "scrub hands" countdown for predetermined time period, say 15 seconds at display 118. Hand wash monitoring system 110 may display (step 226) countdown in descending order such as 15, 14, 13, and so on. Simultaneously, hand wash monitoring system 110 employs first sensor 130 to check (step 228) presence of user near hand washing sink 137. If the user is still present and follows the instruction displayed till the end of countdown (step 226), then method 200 moves to step 230. If first sensor 130 determines that user is not present near hand washing sink 137 indicating he has walked away (step 228), then method 200 moves to step 234.

At step 230, hand wash monitoring system 110 displays instruction "dry hands" on display 118 indicating to user to use paper towel 163 from paper towel dispensing unit 162 for drying his hands, as shown in FIG. 7F. In one example, hand wash monitoring system 110 may display instruction "dry hands" countdown for predetermined time period, say 10 seconds at display 118. Hand wash monitoring system 110 may display countdown in descending order such as 10, 9, 8, and so on. At step 232, hand wash monitoring system 110 checks if the countdown has been completed. If the countdown is complete, then method 200 moves to step 234. It should be understood that hand wash monitoring system 110 displays countdown in descending order until the end of predetermined period i.e., countdown reaches Zero (0) seconds. After completing series/sequence of instructions such as wetting hands, applying soap, scrubbing hands, rinsing hands, and drying hands displayed on display 118, hand wash monitoring system 110 may display a message "Good wash" on display 118 indicating the user has successfully completed hand washing, as shown in FIG. 7G.

At step 234, hand wash monitoring system 110 generates a report including details of successful hand wash and/or failed/incomplete hand wash at steps 216, 222 and 228. The steps in method 200 are repeated every time user/worker/employee wishes to wash his/her hands. As specified above, hand wash monitoring system 110 generates report. In one example, hand wash monitoring system 110 may generate report including details of total number of hand wash's completed by users. In another example, hand wash monitoring system 110 may generate report regarding amount of soap consumed by users in a day or average amount of soap consumed by users per wash. In another example, hand wash monitoring system 110 may generate report regarding amount of paper towel 163 consumed by users in a day or average amount of paper towel 163 consumed by users per wash. Similarly, hand wash monitoring system 110 may be configured to generate different reports based on need. After generating the report, hand wash monitoring system 110 stores the report in first memory 114 or transmits to server 180.

At step 236, hand wash monitoring system 110 is turned OFF. In one example, user may turn OFF hand wash monitoring system 110 using start/stop button 124. Alternatively, power management controller 128 may be configured to turn OFF hand wash monitoring system 110 after a hiatus, say 2 minutes of non-use to prolong life of battery 126.

From the above, it should be clear that hand wash monitoring system 110 coaches/guides user to wash hands properly as per the established protocols and ensures that each instruction is adhered to comply with established protocols. Thus, hand wash monitoring system 110 ensures improved compliance of hand washing with established protocol.

It should be understood that method 200 is explained considering that hand wash monitoring system 110 can be operated by any user in facility/room without requiring any authorization to use hand wash monitoring system 110. Now, referring to FIG. 8, method 300 is provided to explain feature whereby only authorized users can operate hand wash monitoring system 110, in accordance with another embodiment of the present invention. The order in which method 300 is described should not be construed as a limitation, and any number of the described method blocks can be combined in any order to implement method 300 or alternate methods. Additionally, individual blocks may be deleted from method 300 without departing from the spirit and scope of the subject matter described herein. Furthermore, method 300 can be implemented in any suitable hardware, software, firmware, or combination thereof. However, for ease of explanation, in the embodiments described below, method 300 may be implemented using the above-described hand wash monitoring system 110.

In the current embodiment, hand wash monitoring system 110 is configured such that only authorized users will be able to operate or access hand wash monitoring system 110 for washing hands. In order to allow only authorized users to operate, hand wash monitoring system 110 is configured to uniquely identify users. As such, each of the users may be provided with Personal Identification Number (PIN) such as number, alphabets or combination thereof. PIN may include passcode, employee ID and so on. After assigning PIN for each user, PINs may be stored in first memory 114. Whenever user wishes to use hand wash monitoring system 110, he/she may use input device 116 to input their respective PIN to operate hand wash monitoring system 110. Although it is explained that input device 116 is used to input PIN for identifying users, other technologies such as badge recognition, radio or RFID, voice recognition, facial recognition, iris scan, and others may also be used to recognize/authorize users to operate hand wash monitoring system 110.

As specified above, hand wash monitoring system 110 may be turned ON when user presses start/stop button 124 or when user turns ON faucet 135. As such, when hand wash monitoring system 110 is turned ON, method 300 starts at step 302. After turning ON, hand wash monitoring system 110 displays a message "enter PIN", as shown at step 304. Subsequently, user may input his/her using input device 116. At step 306, hand wash monitoring system 110 checks if the PIN provided by user is correct. In order to check whether the PIN is correct, hand wash monitoring system 110 may employ user identification device 122 to compare PIN inputted by the user with PIN stored in first memory 114. If the PIN matches, then method 300 moves to step 310. If the PIN does not match with stored PIN, then method 300 moves to step 308. At step 308, hand wash monitoring system 110 checks if the user enters correct PIN within predetermined time (e.g., 5 seconds) or attempts (e.g., 3 attempts). If hand wash monitoring system 110 does not receive any response even after completion of predetermined time (e.g., 5 seconds) or attempts, then method 300 moves to step 344. If receives response, then method 300 moves to step 304.

After receiving correct PIN, hand wash monitoring system 110 displays an instruction "wet hands" at display 118, as shown at step 310. An example of hand wash monitoring system 110 displaying instruction "wet hands" is shown in FIG. 7A.

At step 312, hand wash monitoring system 110 checks if user's hands are in hand washing sink 137. In order to check presence of user's hands in hand washing sink 137, hand wash monitoring system 110 may employ second sensor 132. If it is determined that user's hands are present in hand washing sink 137, then method 300 moves to step 316. Else, method 300 moves to step 314. At step 314, hand wash monitoring system 110 waits for predetermined time period, say 5 seconds, to check for presence of hands in hand washing sink 137. If second sensor 132 determines that there are no hands in hand washing sink 137 at the end of predetermined time period, then method 200 moves to step 344. If second sensor 132 determines presence of hands in hand washing sink 137 before the end of countdown of predetermined time period, then method 300 moves to step 304.

At step 316, hand wash monitoring system 110 displays instruction "wet hands" countdown at display 118, as shown in FIG. 7A. For example, hand wash monitoring system 110 may display countdown for predetermined time period, say 5 seconds. The countdown may be displayed in descending order such as 5, 4, 3, 2 and 1. Alternatively, countdown may be displayed in ascending order such as 1, 2, 3, 4 and 5.

At step 318, hand wash monitoring system 110 checks if the countdown has been completed. If the countdown is complete, then method 300 moves to step 320. Else, step 316 is repeated. At step 320, hand wash monitoring system 110 displays instruction "apply soap" on display 118 indicating to user to use soap/disinfectant from soap dispending unit 158, as shown in FIG. 7B. In accordance with current embodiment, hand wash monitoring system 110 initiates countdown and displays instruction "apply soap" on display 118, say for 5 seconds. Simultaneously, hand wash monitoring system 110 checks with soap dispending unit 158 if soap/disinfectant stored in it has been dispensed within the predetermined period, as shown at step 322. If soap dispending unit 158 sends instruction that soap has been dispensed within 5 seconds, then method 300 moves to step 324. If hand wash monitoring system 110 does not receive confirmation regarding soap dispensation from soap dispending unit 158 after 5 seconds (step 324), then moves to step 342.

At step 326, hand wash monitoring system 110 displays instruction "scrub hands" on display 118 indicating to user to use soap/disinfectant from soap dispending unit 158, as shown in FIG. 7C. In one example, hand wash monitoring system 110 may display instruction "scrub hands" countdown for predetermined time period, say 15 seconds at display 118, as shown in FIG. 7D. Hand wash monitoring system 110 may display (step 328) countdown in descending order such as 15, 14, 13, and so on. Simultaneously, hand wash monitoring system 110 employs first sensor 130 to check (step 330) presence of user near hand washing sink 137. If the user is still present and follows the instruction displayed till the end of countdown (step 330), then method 300 moves to step 332. If first sensor 130 determines that user is not present near hand washing sink 137 indicating he has walked away, then method 300 moves to step 342.

At step 332, hand wash monitoring system 110 displays instruction "rinse hands" on display 118 indicating to user to use soap/disinfectant from soap dispending unit 158, as shown in FIG. 7E. In one example, hand wash monitoring system 110 may display instruction "scrub hands" countdown for predetermined time period, say 15 seconds at display 118. Hand wash monitoring system 110 may display (step 334) countdown in descending order such as 15, 14, 13, and so on. Simultaneously, hand wash monitoring system 110 employs first sensor 130 to check (step 336) presence of user near hand washing sink 137. If the user is still present and follows the instruction displayed till the end of countdown (step 334), then method 200 moves to step 338. If first sensor 130 determines that user is not present near hand washing sink 137 indicating he has walked away, then method 300 moves to step 342.

At step 338, hand wash monitoring system 110 displays instruction "dry hands" on display 118 indicating to user to use paper towel 163 from paper towel dispensing unit 162 for drying his hands, as shown in FIG. 7F. In one example, hand wash monitoring system 110 may display instruction "dry hands" countdown for predetermined time period, say 10 seconds at display 118. Hand wash monitoring system 110 may display countdown in descending order such as 10, 9, 8, and so on. At step 340, hand wash monitoring system 110 checks if the countdown has been completed. If the countdown is complete, then method 300 moves to step 342. It should be understood that hand wash monitoring system 110 displays countdown in descending order until the end of predetermined period i.e., countdown reaches Zero (0) seconds. After completing series of instructions such as wetting hands, applying soap, scrubbing hands, rinsing hands, and drying hands displayed on display 118, hand wash monitoring system 110 may display a message "Good wash" on display 118, as shown in FIG. 4G.

At step 342, hand wash monitoring system 110 generates report including details of the hand wash and/or failure of hand wash at steps 324, 330 and 336. The steps in method 300 are repeated every time user wishes to wash his hands.

As specified above, hand wash monitoring system 110 generates report. In one example, hand wash monitoring system 110 may generate report including details of number of hand wash's completed by each user based on PIN inputted by user. In another example, hand wash monitoring system 110 may generate report regarding amount of soap consumed by each user in a day or average amount of soap consumed by each user per wash. In another example, hand wash monitoring system 110 may generate report regarding amount of paper towel 163 consumed by each user in a day or average amount of paper towel 163 consumed by users per wash. Similarly, hand wash monitoring system 110 may be configured to generate different reports based on need. After generating the report, hand wash monitoring system 110 stores the report in first memory 114 or transmits to server 180.

At step 344, hand wash monitoring system 110 is turned OFF. In one example, user may turn OFF hand wash monitoring system 110 using start/stop button 124. Alternatively, power management controller 128 may be configured to turn OFF hand wash monitoring system 110 after a hiatus, say 2 minutes of non-use to prolong life of battery 126.

In one embodiment, hand wash monitoring system 110 may be configured to recognize hand washing gestures to obtain behaviour analytics of users using hand wash monitoring system 110. In order to recognize hand washing gestures, at first, first sensor 130 or second sensor 132 may be configured to recognize a variety of subtle and complex human movements i.e., hand movements performed during hand washing. Hand movements may include wetting hands, applying soap on hands, scrubbing hands, rinsing hands, and drying hands. In the current embodiment, when hand wash monitoring system 110 is turned ON, first sensor 130 or second sensor 132 may recognize hand movements performed during hand washing and send signals to first processor 112. First processor 112 may analyse the hand movements using deep learning techniques. For instance, first processor 112 may identify hand and finger movements by detecting multiple feature points such as joints and fingertips from an image or image feed of hands and determine the handwashing movements as a combination of hand shape and repetitive rubbing motions based on the positional relationship of the feature points. If the hand movements do not match with predetermined positional relationship of the feature points of hand movements, then first processor 112 may trigger an alert and display on display 118 that the user is not washing hands properly. This way, hand wash monitoring system 110 may detect and display each step to users to indicate that each step of the established protocol of hand washing process has been completed before they can move to the next step. Hand wash monitoring system 110 may further be configured to record each step including timestamp and duration of each handwashing action to obtain behaviour analytics of users using hand wash monitoring system 110 using variety of known techniques.

Figure 9:
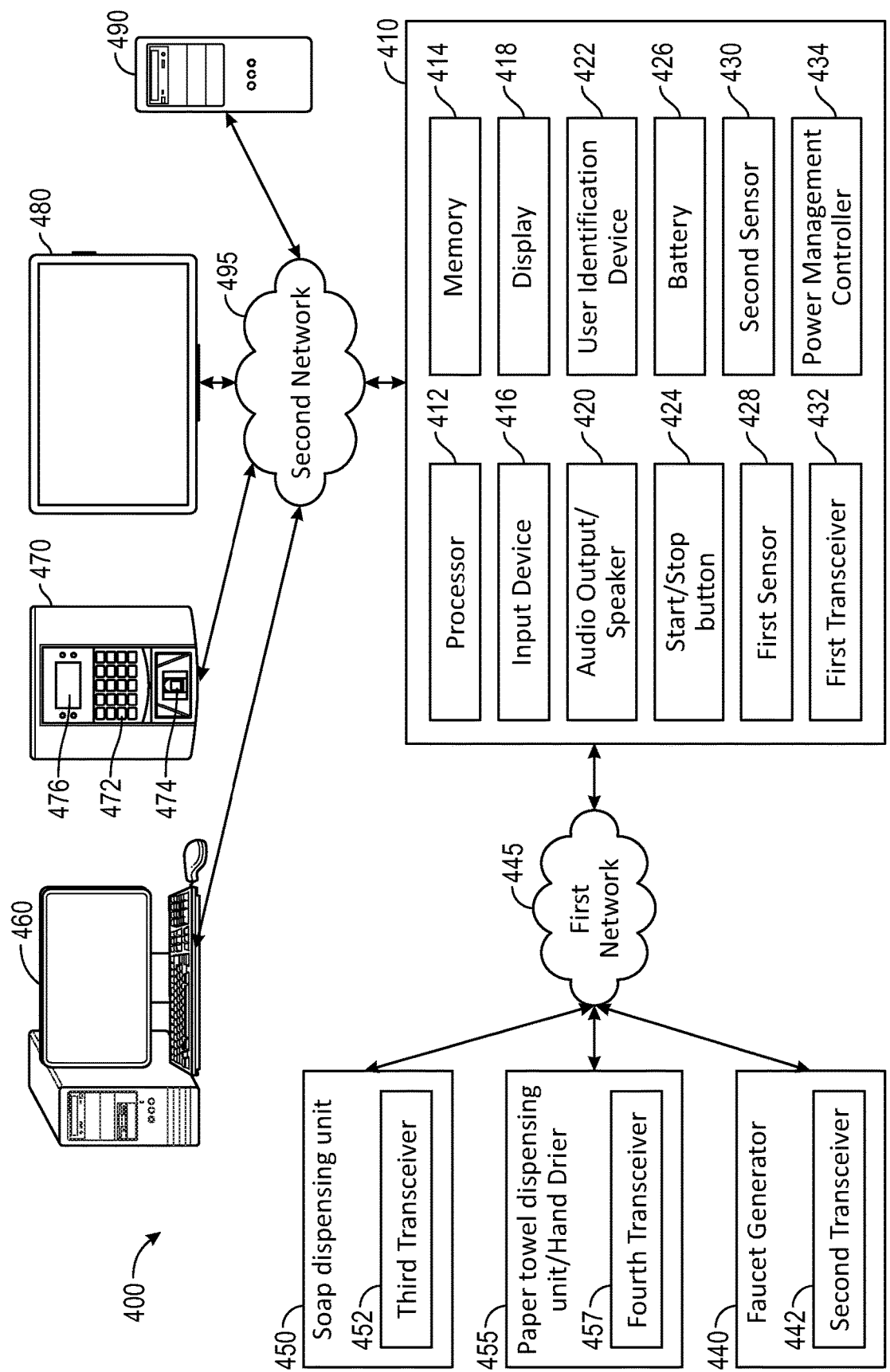
FIG. 9 illustrates an environment in which hand wash monitoring system is implemented, in accordance with another embodiment of present invention.
Figure 10:
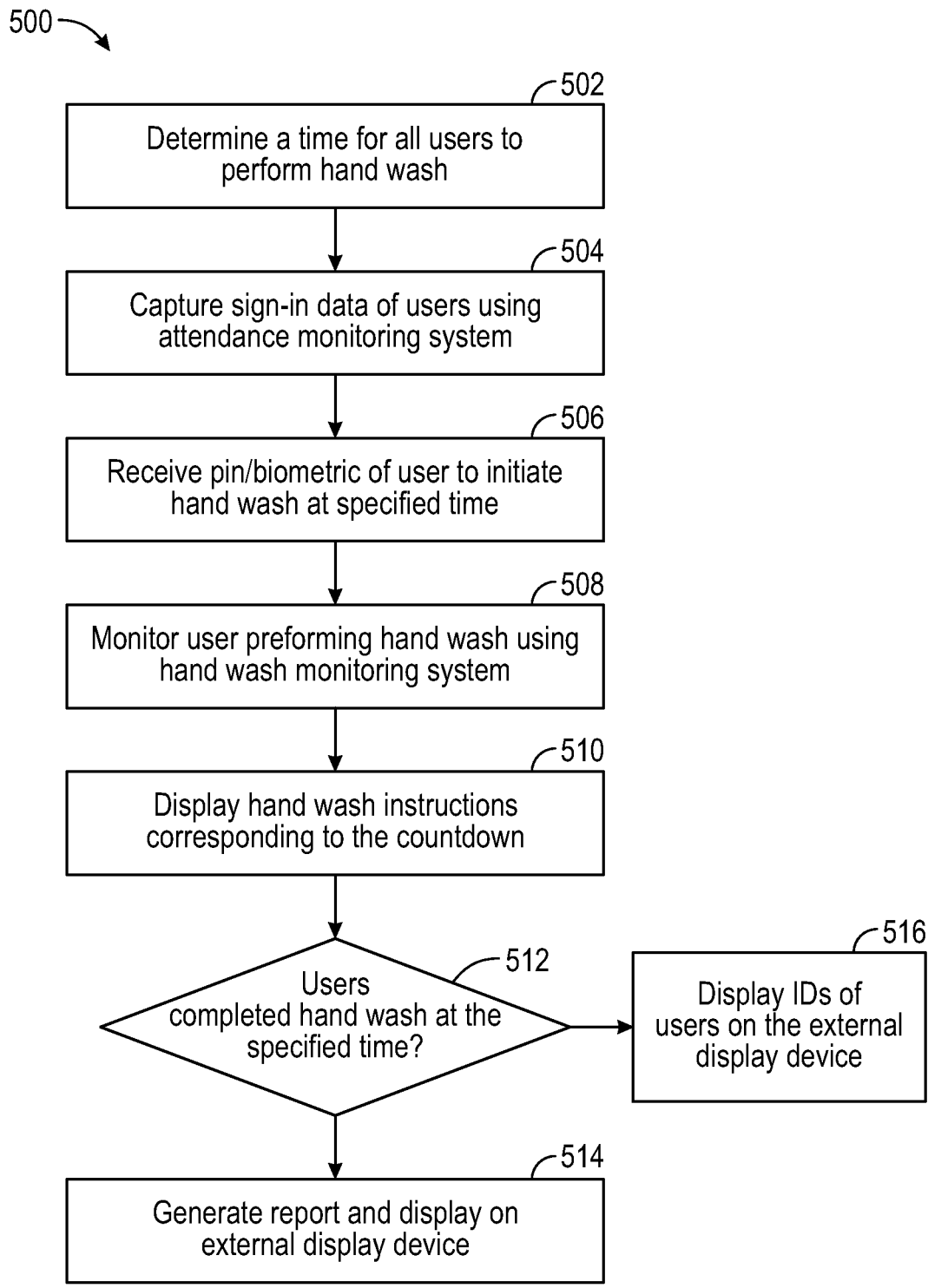
FIG. 10 illustrates a method implemented by hand wash hub system for monitoring and displaying compliance of hand washing by users, in accordance with one embodiment of present invention.

Now referring to FIG. 9, an environment 100 in which hand wash monitoring system 410 is implemented is shown, in accordance with another embodiment of the present invention. Hand wash monitoring system 410 includes processor 412, memory 414, input device 416, display 418, audio output/speaker 420, user identification device 422, start/stop button 424, battery 426, power management controller 428, first sensor 430, second sensor 432, and first transceiver 434. Each of processor 412, memory 414, input device 416, display 418, audio output/speaker 420, user identification device 422, start/stop button 424, battery 426, power management controller 428, first sensor 430, second sensor 432, and first transceiver 434 of hand wash monitoring system 410 is similar in form and function to that of first processor 112, first memory 114, input device 116, display 118, audio output/speaker 120, user identification device 122, start/stop button 124, battery 126, power management controller 128, first sensor 130, second sensor 132, and first transceiver 134 of hand wash monitoring system 110, as explained above.

Further, hand wash monitoring system 410 is communicatively coupled to faucet generator 440 (similar to faucet generator 140), soap dispending unit 450 (similar to soap dispending unit 158), and paper towel dispensing unit/hand drier 455 (similar to paper towel dispensing unit 162) via first network 445 (similar to first network 170). Faucet generator 440 includes second transceiver 442 (similar to second transceiver 156). Soap dispending unit 450 includes third transceiver 452 (similar to third transceiver 160). Paper towel dispensing unit 455 includes fourth transceiver 455 (similar to fourth transceiver 164).

In the current embodiment, hand wash monitoring system 410 is further communicatively coupled to hand wash hub system 460, attendance monitoring system 470, external display device 480 and server 490 (similar to server 180) via second network 495 (similar to second network 175).

The current embodiment is presented to illustrate an embodiment where one or more hand wash monitoring systems 410 are provided in facility such as a healthcare, food processing, foodservice, and other facilities/industries, such as restaurants, hospitals, hotels, manufacturing facilities, and others. Each of hand wash monitoring systems 410 is placed above different hand washing sinks located at different locations within the facility. Each of hand wash monitoring systems 410 is connected to hand wash hub system 460. Hand wash hub system 460 may indicate a centralized system configured to fetch data from each of hand wash monitoring systems 410 installed in facility. In one example, hand wash hub system 460 may include computer, laptop, or any other electronic device.

Attendance monitoring system 470 may be installed at an entry point/gate of the facility. Attendance monitoring system 470 may include input system 472, biometric device 474 and display unit 476. Input system 472 may include numeric or alphanumeric keypad. Biometric device 474 may include fingerprint scanner, facial recognition device, hand gesture recognition device, Iris scan and so on. Display unit 476 may be used for displaying data in the form of text/video to users. Alternatively, attendance monitoring system 470 may utilize variety of technologies such as badge recognition, radio or RFID, voice recognition to recognize users entering the facility.

External display device 480 may include display device or monitor provided in variety of sizes. In the current embodiment, external display device 480 may be installed at an area where users/workers/employees of facility will be able to view performance details of users' hand washing.

The current embodiment is provided to display compliance of users washing hands for improving compliance of hand washing in the facility. As known, attendance monitoring system 470 may be used to capture entry or exit details of users in facility. As such, number of users present in the facility at any given of time may be obtained using attendance monitoring system 470. Data corresponding to attendance of users is provided to hand wash hub system 460. Further, users complying to hand washing standards is fetched from each of hand wash monitoring systems 410 (as explained above using at least method 300 with the help of FIG. 8).

In the current embodiment, each of the users in the facility may be assigned with a specific time at which they have to wash hands. For example user named Alex may be determined to wash his hands at 10:30 AM, every day. Alternatively, team of users may be assigned with a specific time at which they have to wash hands. Further, each of users may be provided with PIN (or employee Identification number (IDs)). As such, each of the users may have to enter their PIN and wash hands as per established protocol at the specified time. Hand wash hub system 460 fetches details of users complying with hand washing protocol and displays it at external display device 480.

Now referring to FIGS. 10 through 13B, a method 500 of monitoring and displaying compliance of hand washing by users is explained, in accordance with one exemplary embodiment of the present invention. The order in which method 500 is described should not be construed as a limitation, and any number of the described method blocks can be combined in any order to implement method 500 or alternate methods. Additionally, individual blocks may be deleted from method 500 without departing from the spirit and scope of the subject matter described herein. Furthermore, method 500 can be implemented in any suitable hardware, software, firmware, or combination thereof. However, for ease of explanation, in the embodiments described below, method 500 may be implemented using the above-described hand wash hub system 460.

At step 502, hand wash hub system 460 determines time for each user in a facility for performing hand wash. In one example, hand wash hub system 460 may determine predefined time for the user to wash hands. For example, the hand wash hub system 460 may determine that user should wash his hands immediately after his entry into facility.

At step 504, attendance monitoring system 470 captures sign-in data i.e., entry or exit details of users in facility. Subsequently, hand wash hub system 460 fetches sign-in data from attendance monitoring system 470. Based on the above example, after fetching sign-in data of the user from attendance monitoring system 470, hand wash hub system 460 may display a message "sign-in hand wash needed" on external display device 480, as shown in FIG. 11. Hand wash hub system 460 is configured to display the message such that user is prompted/reminded to wash hands immediately after his entry into facility. Similarly, hand wash hub system 460 may be configured to display the message at any given time such that user is reminded to wash hands at predefined time.

At step 506, at the specified time, user goes near hand wash monitoring system 410 to wash hands. In order to use hand wash monitoring system 410, user may be prompted to enter PIN or employee ID (here, method 300 is performed). After receiving PIN from user, hand wash monitoring system 410 transmits log-in data of user to hand wash hub system 460.

At step 508, hand wash hub system 460 monitors each user performing hand wash. Specifically, hand wash hub system 460 monitors each of the steps (as explained using method 300) performed by user. At step 510, instructions for washing hands are displayed (step 510) on display 418. At step 512, hand wash hub system 460 checks if each user has washed hands based on the instructions displayed on display 418. If users have complied with washing protocols, then hand wash hub system 460 generates report and displays at external display device 480, as shown at step 514. If users have not complied with washing protocols, then hand wash hub system 460 generates report or displays employee IDs of users who did not comply with washing protocols at external display device 480, as shown at step 516.

Figure 13B:
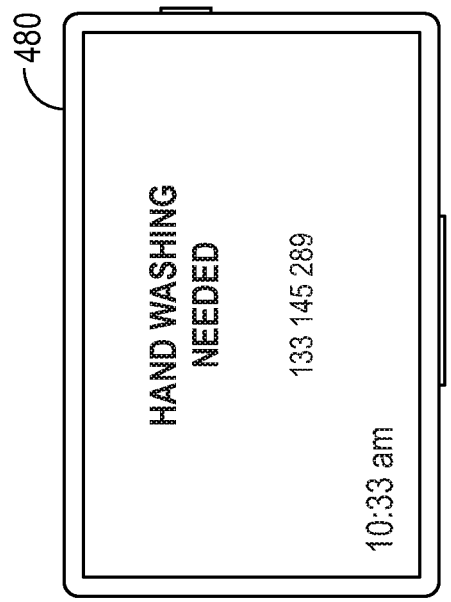
Figure 13A:

In one example, hand wash hub system 460 may display message on external display device 480 in two different ways. First, hand wash hub system 460 may display message for teams at different times. For example, hand wash hub system 460 may display different messages on external display device 480, one at 10.33 AM and another at 2.52 PM, as shown in FIGS. 12A and 12B, respectively. Second, hand wash hub system 460 may display message for teams at specified time including employees IDs whereby the users will get to know successfully completed hand washing at the specified time or who are remaining to perform hand washing. Referring to FIGS. 13A and 13B, hand wash hub system 460 displaying (list) details of employees/users (IDs) who successfully completed hand washing, and users who did not or remaining to perform hand washing, respectively on external display device 480, are shown, in accordance with one exemplary embodiment. Similarly, hand wash hub system 460 can be configured to display messages to increase the frequency of hand washing in a day.

Based on the above, it is evident that hand wash monitoring system can be used to confirm hand wash compliance with the established procedure. For example, CDC recommends people working in food service industry wash their hands at the start of every shift and at least once every hour. The presently disclosed hand wash monitoring system can be installed at food service facilities to motivate and monitor people washing their hands thereby improving compliance with CDC recommendations. For example, the presently disclosed hand wash monitoring system may be installed in a restaurant having various areas or departments. As such, hand wash monitoring system, hand wash hub system, and external display device may be used to improve hand washing compliance and frequency between various areas or departments within the restaurant by ranking and displaying the scores from continuous analysis of the hand washing data collected by the monitoring system described herein.

Further, the presently disclosed hand wash monitoring system can be installed at any other place such as hospitals, industries, food processing units to motivate and monitor people washing their hands thereby improving hand hygiene of employees/workers at all times. For example, the presently disclosed hand wash monitoring system may be used in medical environments with the same efficacy as in food preparation environments with appropriate changes in policies e.g., the timing of hand wash events, and tracking e.g., the way in which employees are assigned to tracking stations.

Further, the presently disclosed hand wash monitoring system includes display to prompt the user through the hand washing sequence. This mechanism provides real-time coaching on proper hand washing technique including real-time feedback to users on appropriate sequence and timing of wetting hands, applying soap, scrubbing hands and rinsing. This ensures improvement in quality of hand washing. Further, hand wash monitoring system monitors compliance of user following plurality of instructions for washing hands at all times. This ensures that in validating and verifying proper and frequent hand washing. For example, hand wash monitoring system ensures that the user wet his hands before applying soap which is critical in avoiding dry and cracked hands. Further, hand wash monitoring system ensures the user rinse his hands before drying his hands to ensure that the residue soap does not cause irritation to his/her skin.

As specified above, presently disclosed hand wash monitoring system includes external display device that is used to display name or identification numbers of employees or users schedules to wash their hands. As external display device is installed at a place visible to all employees, they can see who needs to wash their hands to remain in compliance, and to help each other remain in compliance in the event someone doesn't see their notice to wash, etc. In one implementation, external display device may be configured to list names of users/workers, who are at the hand washing sink washing their hands. As a result, employees who try to cheat can be reduced or eliminated. Further, external display device can be used to notify employees when they need to wash, to deter cheating the system, and to motivate compliance through social pressure of the team members. In one implementation, employees, as individuals or as team, may be ranked based on their hand washing compliance performance. This ensures competition among employees to improve hand washing compliance and frequency between various areas or departments within the restaurant or store is also accomplished by ranking and displaying the scores from continuous analysis of the hand washing data collected by the monitoring system described herein. This competition is also extended to other stores within a geographic area, etc.

In one embodiment, hand wash hub system may be configured to trigger event-based alerts and display at hand wash monitoring system. For example, hand wash hub system may be configured to display any changes in policy at hand wash monitoring system such that workers get updated with latest policy requirements.

In one alternate implementation, hand wash monitoring system, soap dispensing unit, and paper towel dispensing unit may transmit data directly to server for generating reports in real-time. Authorized users may view the data and reports from server at any time on any connected device including cell phones, Wi-Fi tablets and phones, computers, laptops, etc. Alternatively, alerts may be generated and transmitted to interested parties when certain events occur including multiple missed hand washes, etc. Further, data can be used to track soap dispenses to see if person gets multiple soap dispenses thereby indicating the amount of soap being dispensed may not be enough. Further, the data can be used to modify the soap quantity being dispensed resulting in less soap being used and more effective soaping levels of the hands. Further, if it is determined that users are not using sufficient soap for hand washing, then soap dispensing unit may be configured to dispense required quantity of soap when the user is operating hand wash monitoring system. This way, the use of soap for hand washing can be increased.

Based on the above, it should be clear that hand washing data is collected to monitor compliance and provide diagnostic information to address behavioral shortfalls in both the quality and frequency of hand washing.

Further, hand wash monitoring system and hand wash hub system disclosed herein uses various technologies to monitor and report use of the water supply, use of the soap dispenser, use of paper towel, presence of a specific employee and correct sequence, timing and frequency of hand washing actions.

Although the above disclosure is generally described in which the hand wash monitoring system monitoring and displaying compliance of hand washing by users is implemented as a single system (hand wash monitoring system), it should be understood that the disclosed hand wash monitoring system may be scaled up such that multiple hand wash monitoring systems can be used in a single facility and results may be displayed in one or more external display devices.

The present invention has been described in particular detail with respect to various possible embodiments, and those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, should be understood as being implemented by computer programs.

Further, certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in them, along with equivalent variations. In addition, the present invention is not described with reference to any particular programming language. It is appreciated that a variety of programming languages may be used to implement the teachings of the present invention as described herein, and any references to specific languages are provided for disclosure of enablement and best mode of the present invention.

It should be understood that components shown in FIGUREs are provided for illustrative purpose only and should not be construed in limited sense. A person skilled in the art will appreciate alternate components that may be used to implement the embodiments of the present invention and such implementations will be within the scope of the present invention.

While preferred embodiments have been described above and illustrated in the accompanying drawings, it will be evident to those skilled in the art that modifications may be made without departing from this invention. Such modifications are considered as possible variants included in the scope of the invention.

What is claimed is:

1. A method of monitoring and displaying compliance of hand washing by users, the method comprising:
    determining, by a hand wash hub system, a predefined time for each user for washing hands, wherein determining further comprises determining a countdown for a plurality of instructions to be displayed to users for washing hands in sequence, wherein the plurality of instructions comprise wetting hands, applying soap, scrubbing hands, rinsing hands, and drying hands, and wherein each of the plurality of instructions is counted for a predetermined time period;
    recognizing, by a hand wash monitoring system, hand and finger movements of the users performing hand wash, wherein the hand and finger movements are recognized by detecting shape of the hands, joints and fingertips of the hands and repetitive motion of the hands wetting hands, applying soap, scrubbing hands, rinsing hands, and drying hands;
    analysing, by the hand wash monitoring system, the hand and finger movements recognized with a predetermined positional relationship of the shape of the hands, the joints and fingertips of the hands and the repetitive motion of the hands wetting hands, applying soap, scrubbing hands, rinsing hands, and drying hands;
    monitoring, by the hand wash monitoring system, users washing hands at the predefined time for checking compliance of users following the plurality of instructions for washing hands; and
    displaying, by the hand wash hub system, compliance of the users washing hands on an external display device based on monitoring users washing hands for improving compliance of hand washing, wherein the displaying the compliance of the users washing hands comprises:
        displaying a list of users who successfully completed hand wash at the predefined time indicating the users who have complied with hand washing;
        displaying a list of users who did not wash hands at the predefined time; and
        displaying a list of users who are remaining to perform hand washing at the predefined time,
    wherein displaying the list of users who have successfully completed hand wash, who did not wash hands and who are remaining to perform hand washing allow the users to identify who needs to wash hands to remain in compliance of hand washing.

2. The method of claim 1, further comprises capturing, by the hand wash hub system, sign-in data of each user from an attendance monitoring system for obtaining a total number of users present in a facility.

3. The method of claim 1, before determining countdown for the plurality of instructions to be displayed to users for washing hands, the method comprises:
    detecting, by the hand wash monitoring system, presence of the hands in a hand washing sink;
    receiving, by the hand wash monitoring system, a signal from a faucet generator in a faucet dispensing water, wherein the signal is received corresponding to water flow rate and temperature of running water from the faucet for initiating the countdown.

4. The method of claim 1, wherein the step of monitoring user users washing hands comprises:
    receiving, by the hand wash monitoring system, biometric or authentication information of users for allowing users to wash hands.

5. The method of claim 1, further comprises monitoring and generating a report corresponding to quantity of water dispensed for each hand wash.

6. The method of claim 1, further comprises monitoring and generating a report corresponding to quantity of soap dispensed for each hand wash.

7. The method of claim 1, further comprises monitoring and generating a report corresponding to quantity of paper used for drying hand for each hand wash.

8. A hand wash hub system in conjunction with a hand wash monitoring system for monitoring and displaying compliance of hand washing by users, the hand wash monitoring system comprising:
    a processor; and
    a memory coupled to the processor, wherein the processor is configured to execute program instructions stored in the memory, to:

determine a predefined time for each user to perform hand wash, wherein determining further comprises determining countdown for a plurality of instructions to be displayed to users for washing hands in sequence, wherein the plurality of instructions comprise wetting hands, applying soap, scrubbing hands, rinsing hands, and drying hands, and wherein each of the plurality of instructions is counted for a predetermined time period;

recognize hand and finger movements of the users performing hand wash, wherein the hand and finger movements are recognized by detecting shape of the hands, joints and fingertips of the hands and repetitive motion of the hands wetting hands, applying soap, scrubbing hands, rinsing hands, and drying hands;

analyse the hand and finger movements recognized with a predetermined positional relationship of the shape of the hands, the joints and fingertips of the hands and the repetitive motion of the hands wetting hands, applying soap, scrubbing hands, rinsing hands, and drying hands;

monitor users performing hand wash at the predefined time using the hand wash monitoring system for checking compliance of users following the plurality of instructions for washing hands; and display compliance of the users washing hands on an external display device for improving compliance of hand washing, wherein displaying the compliance comprises:
 displaying a list of users who successfully completed hand wash at the predefined time indicating the users who have complied with hand washing;
 displaying a list of users who did not wash hands at the predefined time indicating the users who have not complied with hand washing; and
 displaying a list of users who are remaining to perform hand washing at the predefined time, wherein displaying the list of users who have successfully completed hand wash, who did not wash hands and who are remaining to perform hand washing allow the users to identify who needs to wash hands to remain in compliance of hand washing.

9. The hand wash hub system of claim 8, further comprises an attendance-monitoring system for capturing sign-in data of each user for obtaining a total number of users present in a facility.

10. The hand wash hub system of claim 8, wherein the hand wash monitoring system comprises an input system for receiving biometric or authentication information of users for allowing users to perform hand wash.

11. The hand wash hub system of claim 8, wherein the hand wash monitoring system comprises sensors to detect presence of the hands in the hand washing sink and monitor users performing hand wash, wherein the sensors use imaging, infrared, and laser techniques to detect presence of the hands in the hand washing sink.

12. The hand wash hub system of claim 8, wherein the hand wash monitoring system comprises:
 a faucet generator mounted at a faucet, wherein the faucet generator monitors quantity of water dispensed from the faucet for each hand wash;
 a soap dispensing unit for dispensing soap; and
 a paper towel dispensing unit for dispensing paper towel for drying hands.

13. The hand wash hub system of claim 12, further comprises a server, wherein each of the hand wash hub system, the hand wash monitoring system, the faucet generator, the soap dispensing unit and the paper towel dispensing unit communicatively connects and transmits data to the server, and wherein the server generates reports based on the data transmitted.

* * * * *